United States Patent [19]
Graf

[11] Patent Number: 5,911,048
[45] Date of Patent: *Jun. 8, 1999

[54] SYSTEM FOR MANAGING GROUP OF COMPUTERS BY DISPLAYING RELEVANT NON-REDUNDANT MESSAGES BY EXPRESSING DATABASE OPERATIONS AND EXPERT SYSTEMS RULES TO HIGH LEVEL LANGUAGE INTERPRETER

[76] Inventor: Lars Oliver Graf, 14E Circle Dr., Rensselaer, N.Y. 12144

[ * ] Notice: This patent is subject to a terminal disclaimer.

[21] Appl. No.: 08/787,117

[22] Filed: Jan. 22, 1997

Related U.S. Application Data

[62] Division of application No. 08/238,476, May 5, 1994, Pat. No. 5,619,656.

[51] Int. Cl.$^6$ .................................................... G06F 11/00
[52] U.S. Cl. ............................. 395/200.54; 395/185.01; 395/185.1; 395/200.37
[58] Field of Search ............................... 395/82, 200.54, 395/185.01, 185.1, 200.37; 706/11, 50, 52

[56] References Cited

U.S. PATENT DOCUMENTS

| | | | |
|---|---|---|---|
| 4,787,035 | 11/1988 | Bourne ........................................ | 395/82 |
| 5,119,318 | 6/1992 | Paradies et al. .......................... | 706/52 |
| 5,412,753 | 5/1995 | Alston et al. .............................. | 706/11 |
| 5,615,309 | 3/1997 | Bezek et al. ............................... | 706/50 |

OTHER PUBLICATIONS

Ysai et al., "A Management Paradigm in Large Distributed Computing Environment", Proceedings of the Third Workshop on Future Trends of Distributed Computing Systems, IEEE Computer Society Press, 1992, pp. 129–134.

Mettrey, "A Comparative Evaluation of Expert System Tools", Journal of the IEE Computer Society, vol. 24, Issue 2, 1991, pp. 19–31.

Ginkou et al., "A knowlege–based Plannar for LAN", Conference Paper, 'Communications on the Move', vol. 2, IEEE, 1992, pp. 496–501.

*Primary Examiner*—Thomas C. Lee
*Assistant Examiner*—Anderson I. Chen

[57] ABSTRACT

The system and method of this invention automatically manages a group of computers by automatically gathering data, storing the data, analyzing the stored data to identify specified conditions, and initiating automated actions to respond to the detected conditions. The invention, hereafter "SYSTEMWatch AI-L", comprises a SYSTEMWatch AI-L client which turns a computer into a managed computer, a SYSTEMWatch AI-L console, which turns a computer into a monitoring computer, a SYSTEMWatch AI-L send facility, which allows a system administrator to send commands to various SYSTEMWatch AI-L clients through the SYSTEMWatch AI-L console, and a SYSTEMWatch AI-L report facility which allows a system administrator to query information collected and processed by the SYSTEMWatch AI-L clients and SYSTEMWatch AI-L consoles.

2 Claims, 12 Drawing Sheets

SYSTEM FOR MANAGING GROUP OF COMPUTERS BY DISPLAYING RELEVANT NON-REDUNDANT MESSAGES BY EXPRESSING DATABASE OPERATIONS AND EXPERT SYSTEMS RULES TO HIGH LEVEL LANGUAGE INTERPRETER

This applicatin is a division of application Ser. No. 08/238,476 filed May 5, 1994 which application is now U.S. Pat. No. 5,619,656.

FIELD OF THE INVENTION

This invention relates in general to system administration and in particular to automated management of a group of computers and its associated hardware and software.

BACKGROUND ART

The following documents are hereby incorporated by reference in its entirety:

1. *Object Oriented Programming*, Coad P., and Nicola J., YourDon Press Computing Series, 1993., ISBN 0-13-032616-X.
2. *The C Programming Language*, Kernighan B., and Ritchie D., 1st Edition, Prentice-Hall Inc., ISBN 0-13-110163-3
3. *The Unix Programming Environment*, Kernighan and Pike, Prentice-Hall Inc., ISBN 013-937699-2
4. *Unix Network Programming*, Stevens, Prentice Hall Software Series, 1990, ISBN 0-13-949876-1.
5. *Internetworking with TCP/IP, Volume I, Principles, Protocols, and Architecture*, 2d Ed, Prentice Hall, 1991, ISBN 0-13-468505-9.
6. *Solaris 1.1, SMCC VersionA, AnswerBook for SunOS 4.1.3 and Open Windows Version* 3, Sun Microsystems Computer Corporation, Part Number 704-3183-10, Revision A.
7. *Artificial Intelligence*, Rich E., McGraw-Hll, 1983, ISBN 0-07-052261-8.
8. *Artificial Intelligence*, Winston P., 2d Edition, 1984, ISBN 0-201-08259-4.
9. Documentation for the SunOS 4.1.3 operating system from Sun Microsystems, Inc.
10. SunOS 4.1.3 manual pages ("man pages") from Sun Microsystems, Inc.

As used within this document and its accompanying drawings and figures, the following terms are to be construed in this manner:

1. "CPU" shall refer to the central processing unit of a computer if that computer has a single processing unit. If the computer has multiple processors, the term CPU shall refer to all the processing units of such a system.
2. "Managing a computer" shall refer to the steps necessary to manage a computer, for example, gathering and storing information, analyzing information to detect conditions, and acting upon detected conditions.

The problem of system administration for a computer with a complex operating system such as the UNIX operating system is a complex one. For example, in the UNIX workstation market, it is common for an organization to hire one system administrator for every 20–50 workstations installed, with each such administrator costing a company (including salary and overhead) between $60,000 and $100,000. Indeed, some corporations have discovered that despite freezing or cutting back hardware and software purchases, the rising cost of retaining system administrators has nevertheless continued to escalate the cost of maintaining an Information Services organization at a substantial rate.

In a typical system administration environment, the work cycle consists of the following. A problem occurs on the computer which prevents the end user from carrying out some task. The end user detects that problem some time after it has occurred, and calls the complaint desk. The complaint desk dispatches a system administrator to diagnose and remedy the problem. This has three important consequences: First, problems are detected after they have blocked a user's work. This can be of substantial impact in organizations which use their computers to run their businesses. Second, problems which do not necessarily block a user's work, but which may nonetheless have important consequences, are difficult to detect. For example, one vendor supplies an electronic mail package which is dependent upon a functional mail daemon process. This mail daemon process has a tendency to die on an irregular, but frequent basis. In such situations, the end user typically does not realize that he is not capable of receiving electronic mail until after they've missed a meeting scheduled by electronic mail. Third, because problems are not detected until after they block a user's work, a problem which at an earlier state might have been easier to fix cannot be fixed until it has escalated into something more serious, and more difficult to correct.

Currently, system administrators manage a group of computers by performing most actions manually. Typically, the system administrator periodically issues a variety of commands to gather information regarding the state of the various computers in the group. Based upon the information gathered, and based upon a variety of non-computer information, the system administrator detects problems and formulates action plans to deal with the detected problems. Automation of a system administration's task is difficult for several reasons:

1. Data regarding the state of the computer is difficult to obtain. Typically, the system administrator must issue a variety of commands and consider several pieces of information from each command in order to diagnose a problem. If the system administrator is responsible for several machines, these commands must be repeated on each machine.
2. When the system administrator detects a problem, the appropriate action plan may vary depending on a variety of external factors. For example, suppose a particular computer becomes slow and unresponsive when the system load on that computer crosses a certain threshold. If this problem occurs during normal business hours under ordinary circumstances, it will probably be a problem which must be resolved in a timely manner. On the other hand, suppose this problem occurs in the middle of the night. While this situation might still be a problem, the resolution need not be as timely since the organization's work will not be impacted, unless the problem still exists by the start of the business day. Now suppose the accounting department, at the end of each month, runs a processor intensive task to do the end-of-month accounting, which normally forces the load average above that threshold. If the system load crosses that same average during the time when the accounting department runs their end of month program, that's not a problem. In order to build a tool to handle situations like these using current tools would require writing a large series of inter-related complex boolean expressions. Unfortunately, writing and testing such a series of complex boolean expressions are difficult.

3. Current system administration tools view the universe of computer problems as a static universe. Computer problems, however, evolve over time as hardware and software are added, removed, and replaced in a computer.

4. Furthermore, an automated tool should also flexibly alter its behavior based on the nature of the commands a system administrator issues to it in guiding it in to resolve problems. Thus, if the system administrator routinely ignores a particular problem, the automated tool should warn the system administrator less frequently if the routinely ignored problem reoccurs.

What is needed is a tool which will automatically gather the necessary computer information to manage a group of computers, detect problems based upon the gathered information, inform the system administrator of detected problems, and automatically perform corrective actions to resolve detected problems.

SUMMARY OF THE INVENTION

The shortcomings of the prior art are overcome and additional advantages are provided in accordance with the principles of the present invention through the provision of SYSTEMWatch AI-L, which automatically manages at least one computer by automatically gathering computer information, storing the gathered information, analyzing the stored information to identify specific computer conditions, and performing automatic actions based on the identified computer conditions.

BRIEF DESCRIPTION OF DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompaning drawings in which:

DESCRIPTION OF THE PREFERRED EMBODIMENT

Figure 1:
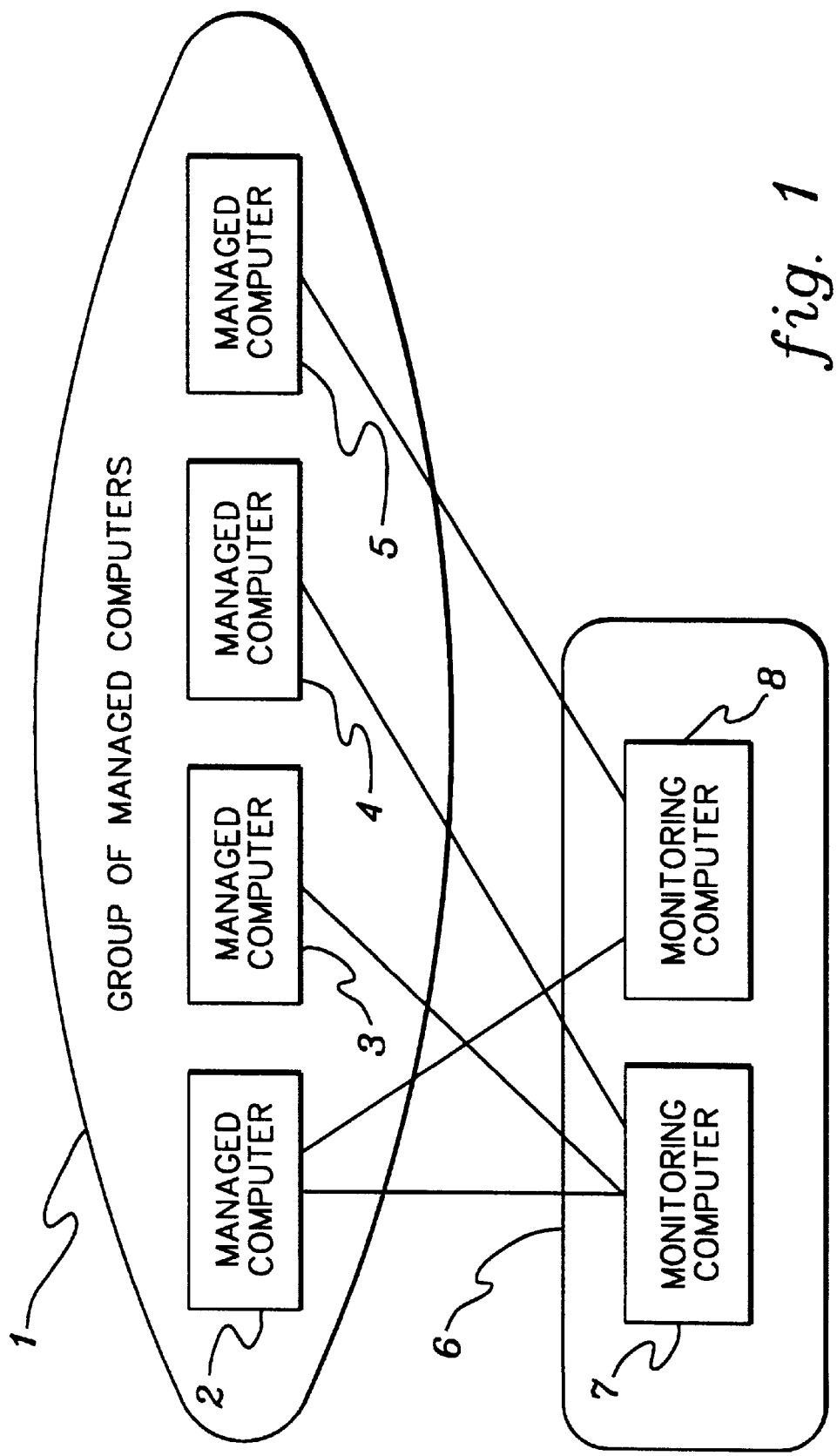
FIG. 1 illustrates an embodiment of the present invention which comprises two groups of computers, a group of managed computers and a group of monitoring computers.
Figure 2:
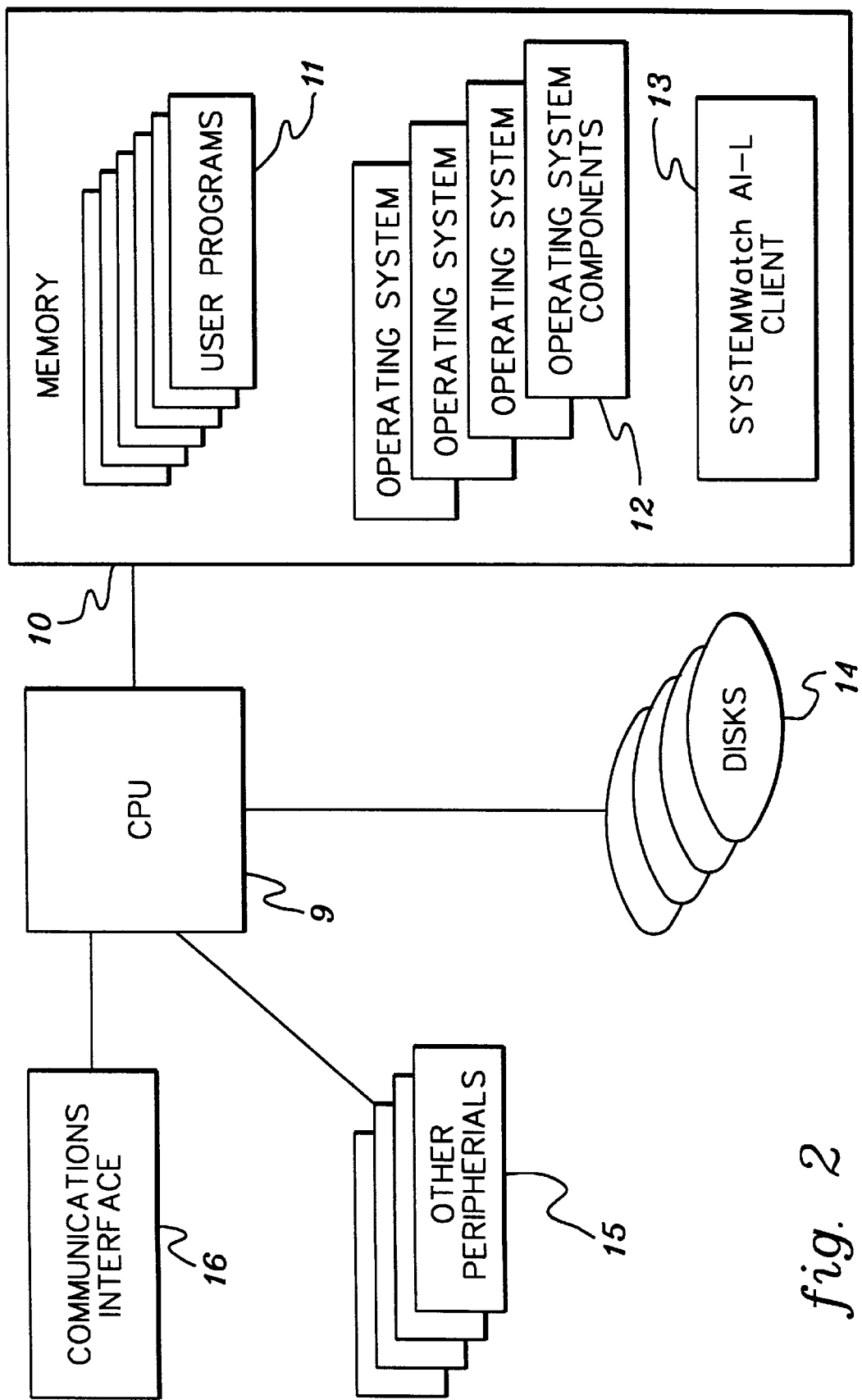
FIG. 2 illustrates one example of the structure of a managed computer, comprising a processing unit, memory, disk, network interface, peripherals, and a SYSTEMWatch AI-L client.

One preferred embodiment of the technique of the present invention of managing a group of computers is targeted at groups of workstations running the UNIX operating system. Alternative embodiments of the present invention can consist of groups of computers running other operating systems, such as, Microsoft's Windows NT and IBM's OS/2. As viewed in FIG. 1, the invention comprises, for instance, 2 groups of computers:

a. A group of managed computers, 1, which includes computers, 2–5, comprising, for example, (see FIG. 2) a CPU, 9, memory, 10, disks, 14, communications interface, 16, other peripherals, 15, and a SYSTEMWatch AI-L client, 13. The size of the managed group of computers can range from 1 to several thousand. Data which is gathered from a managed computer is stored on the managed computer. From time to time, a managed computer may send data to a monitoring computer (see below).

b. A group of monitoring computers, 6, which includes computers comprising, for example, (see FIG. 3) a CPU, 17, memory, 18, disks, 22, communications interface, 24, other peripherals, 23, and a SYSTEMWatch AI-L console, 21. The size of the monitoring group of computers can range from 0 to several hundred. Although data gathered from a managed computer is stored on the managed computer, from time to time a managed computer may send data to a monitoring computer. A monitoring computer can also explicitly request data from a managed computer. Data which is received by the monitoring computer from a managed computer is stored on the monitoring computer. Furthermore, since a monitoring computer can receive data from several managed computers, a monitoring computer may perform post-processing on data received from several managed computer, and/or perform additional data gathering itself, in which case that data is stored on the monitoring computer.

Figure 3:
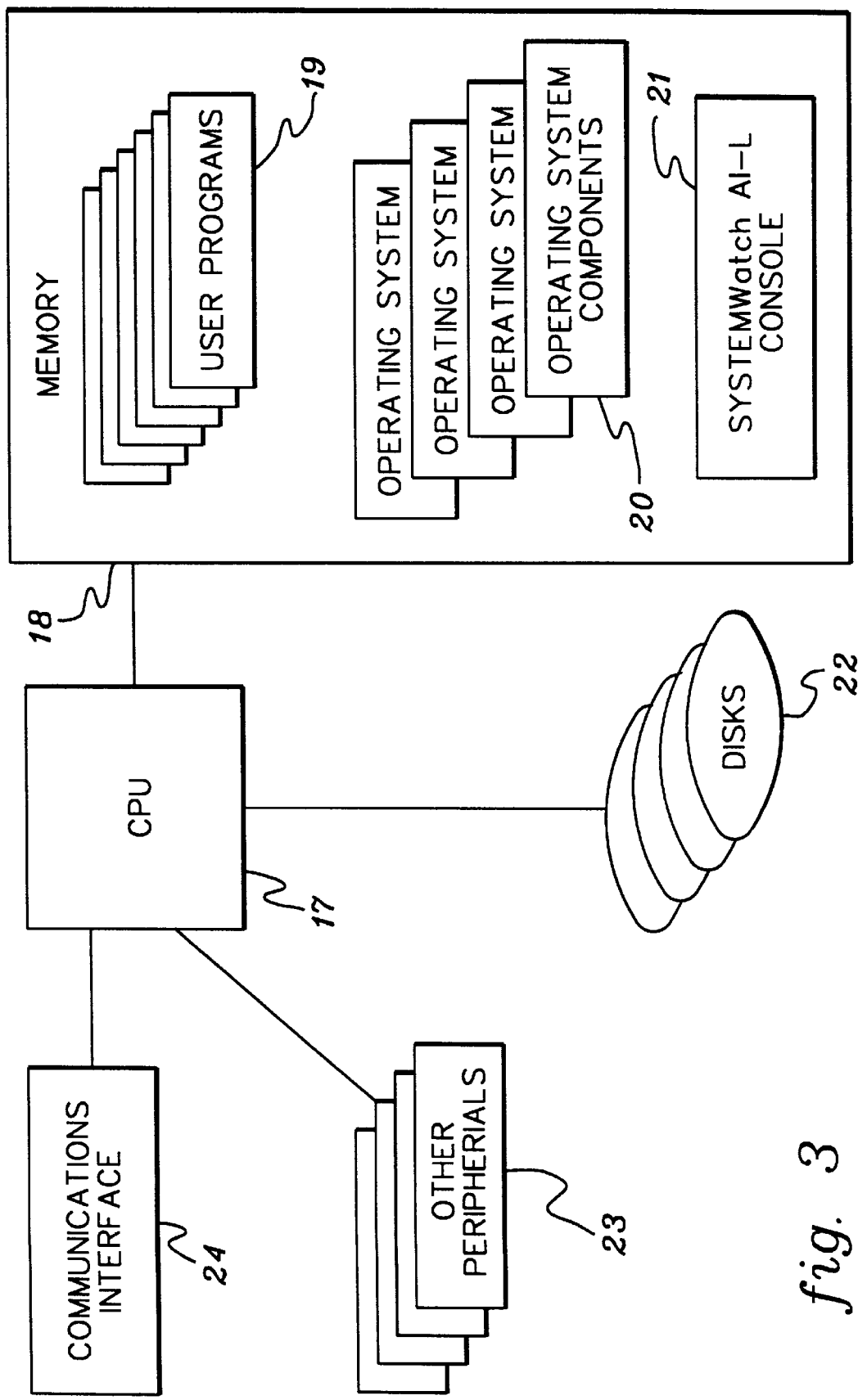
FIG. 3 illustrates one embodiment of the structure of a monitoring & command computer, comprising processing unit, disk, network interface, peripherals, and a SYSTEMWatch AI-L console.
Figure 4:
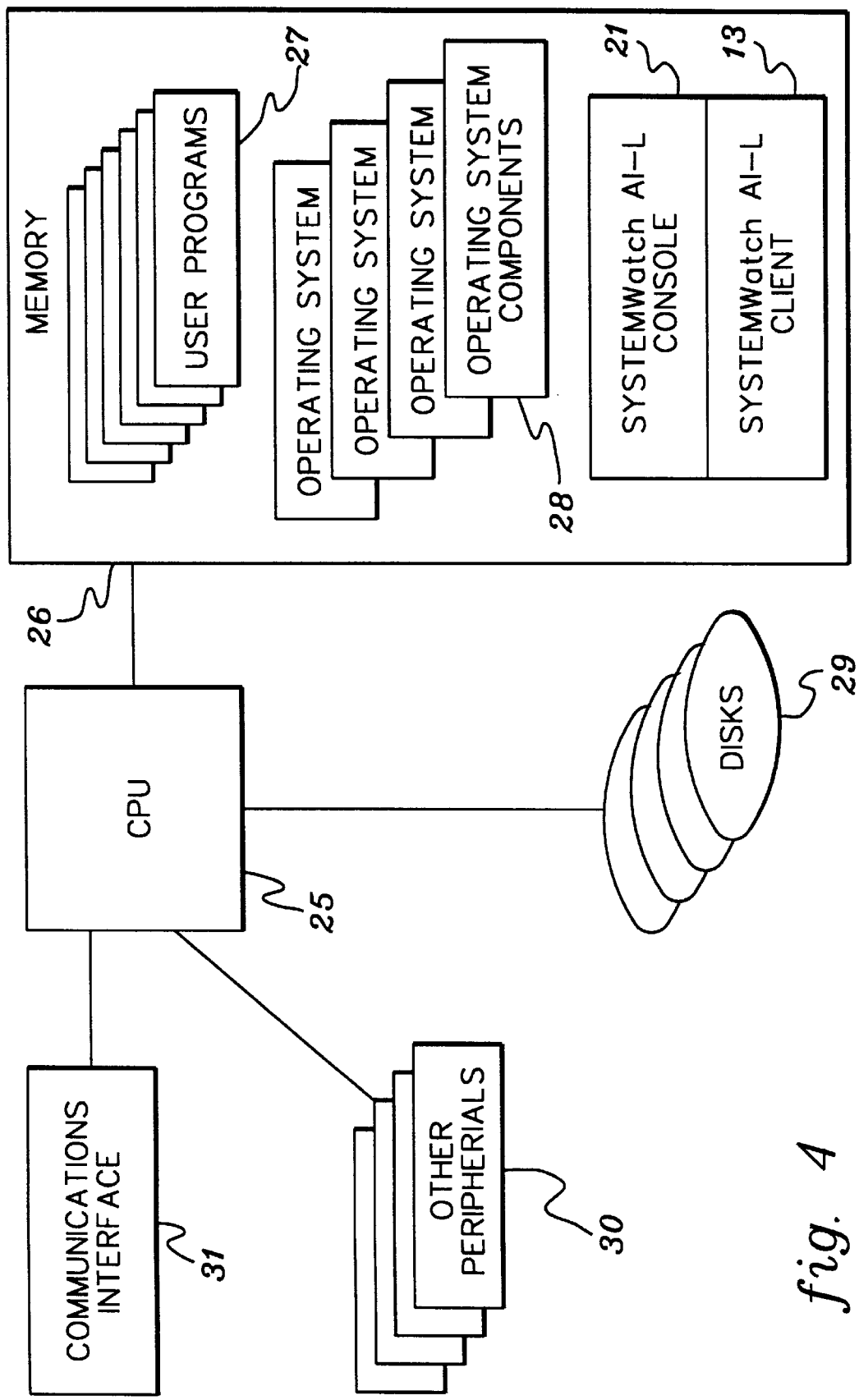
FIG. 4 illustrates one embodiment of the structure of a computer which is both a managed computer and a monitoring computer, comprising a processing unit, disk, network interface, peripherals, a SYSTEMWatch AI-L console, and a SYSTEMWatch AI-L client.

In another embodiment the two groups of computers may be the same group (all managed computers are also monitoring computers), two distinct groups (no managed computers are monitoring computers), or overlap (some managed computers are monitoring computers). The computers which form the groups of computers may be heterogeneous or homogeneous. The only requirement is that each managed computer have the capability to communicate with at least one monitoring computer. One preferred embodiment of this invention is to have all the computers on a computer network, but any other means of communication, e.g., over a modern using a telecommunications network, is adequate. The differentiation between managed and monitoring computers are the SYSTEMWatch AI-L client and the SYSTEMWatch AI-L console, which are described below:

a. As show in FIG. 2, a computer is a managed computer if the computer is running the SYSTEMWatch AI-L client, which provides a means for the computer to automatically detect and respond to problems. Additionally, the SYSTEMWatch AI-L client also accepts and responds to commands issued by a SYSTEMWatch AI-L console described below.

b. As shown in FIG. 3, a computer is a monitoring computer if the computer is running the SYSTEMWatch AI-L console, which provides a means for the computer to receive and display notifications of detected problems, and to display the corrective actions taken. Additionally, the SYSTEMWatch AI-L console is also able to issue commands to any group of managed computers.

c. As shown in FIG. 4, a computer is both a managed computer and a monitoring computer if it contains both SYSTEMWatch AI-L client, 13, and SYSTEMWatch AI-L console, 21.

An Overview of the SYSTEMWatch AI-L Client

Figure 6:
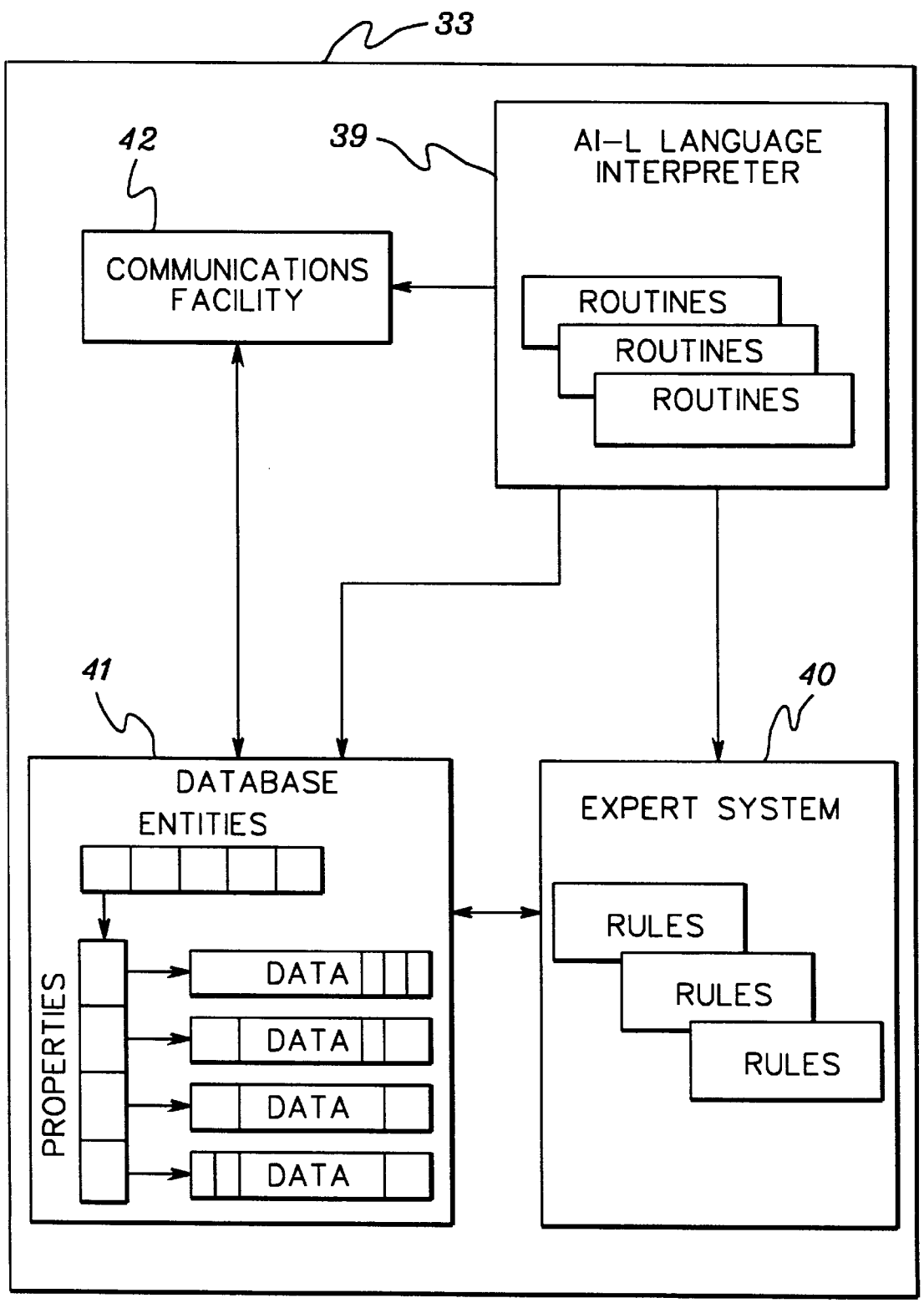
FIG. 6 illustrates one embodiment of the logical structure of the core layer in accordance with the principles of the present invention.

The task of the SYSTEMWatch AI-L client is to manage a computer and to provide notification of management actions to the SYSTEMWatch AI-L console. Before explaining how the SYSTEMWatch AI-L client operates, however, it is necessary to consider how the SYSTEMWatch AI-L client is organized. As previously mentioned, the SYSTEMWatch AI-L client is bifurcated into a core layer, 33, which provides the SYSTEMWatch AI-L client with the underlying mechanism for detecting and responding to problems, and an application layer, 34, which configures the SYSTEMWatch AI-L client to operate in a useful manner. The SYSTEMWatch AI-L client was designed this way because the nature of a particular computer's problem is not static. For example, problems may evolve as changes are made to the hardware and software of the computer, and if the computer is a multi-user computer, as users are added and removed from the system. As computer problems change, only the SYSTEMWatch AI-L client's application layer need be modified. As shown in FIG. 6, the core layer is composed of four elements: a database, 41, an expert system, 40, a language interpreter, 39, and a communications mechanism, 42. One example of a preferred embodiment of the application layer, 34, is a series of programs written in a language which can be interpreted by the language interpreter of the core layer.

Core Layer Description—Database

The first element of the core layer is SYSTEMWatch AI-L database, 41. The database is used for storing gathered data, intermediate results, and other information. Refering to FIG. 7, in the context of the database, SYSTEMWatch AI-L uses two concepts: ENTITYs, 43,53, and PROPERTYs, 44,47, 49, 54, 56. These two features are now described in greater detail:

1. PROPERTY

Conceptually, PROPERTYs are similar to field descriptions. In one embodiment, a PROPERTY has the following features:

TABLE 1

| FEATURE | DESCRIPTION |
| --- | --- |
| NAME | A property must have a name. |
| TYPE | A property must have a type, which corresponds to the type of the data to be stored in the field. |
| FORMAT | A property may optionally have a string which describes how the data in the field should be formatted. The format string is similar to the C language's printf()'s formatting control. |

TABLE 1-continued

| FEATURE | DESCRIPTION |
| --- | --- |
| HEADER | A property may optionally contain a string which will be displayed as the column header when a report featuring records containing the property is displayed. |
| DISPLAYUNIT | A string used by the reporting facility which is appended to the data in the field during a report. Thus, if the PROPERTY is a description of memory utilization in kilobytes, an appropriate DISPLAYUNIT might be "kb" |
| DISPLAYTYPE | Some display formats are commonly used through SYSTEMWatch AI-L. DISPLAYTYPES are keywords which corresponds to a particular FORMAT. Examples of DISPLAYTYPEs include STRING20, for a string limited to 20 characters in width, DATESMALL, for displaying date in mm/dd format, PERCENT, for automatically display numbers between 0.0 and 1.0 as percentages (e.g.: 0.52 is displayed as 52%) |
| SHORTDESC | A PROPERTY may optionally contain an abbreviated description of the PROPERTY. |
| LONGDESC | A PROPERTY may optionally contain a long description of the PROPERTY. |

2. ENTITY

Conceptually, ENTITYs are similar to database tables. In SYSTEMWatch AI-L, ENTITYs are used to group related PROPERTYs.

Figure 7:
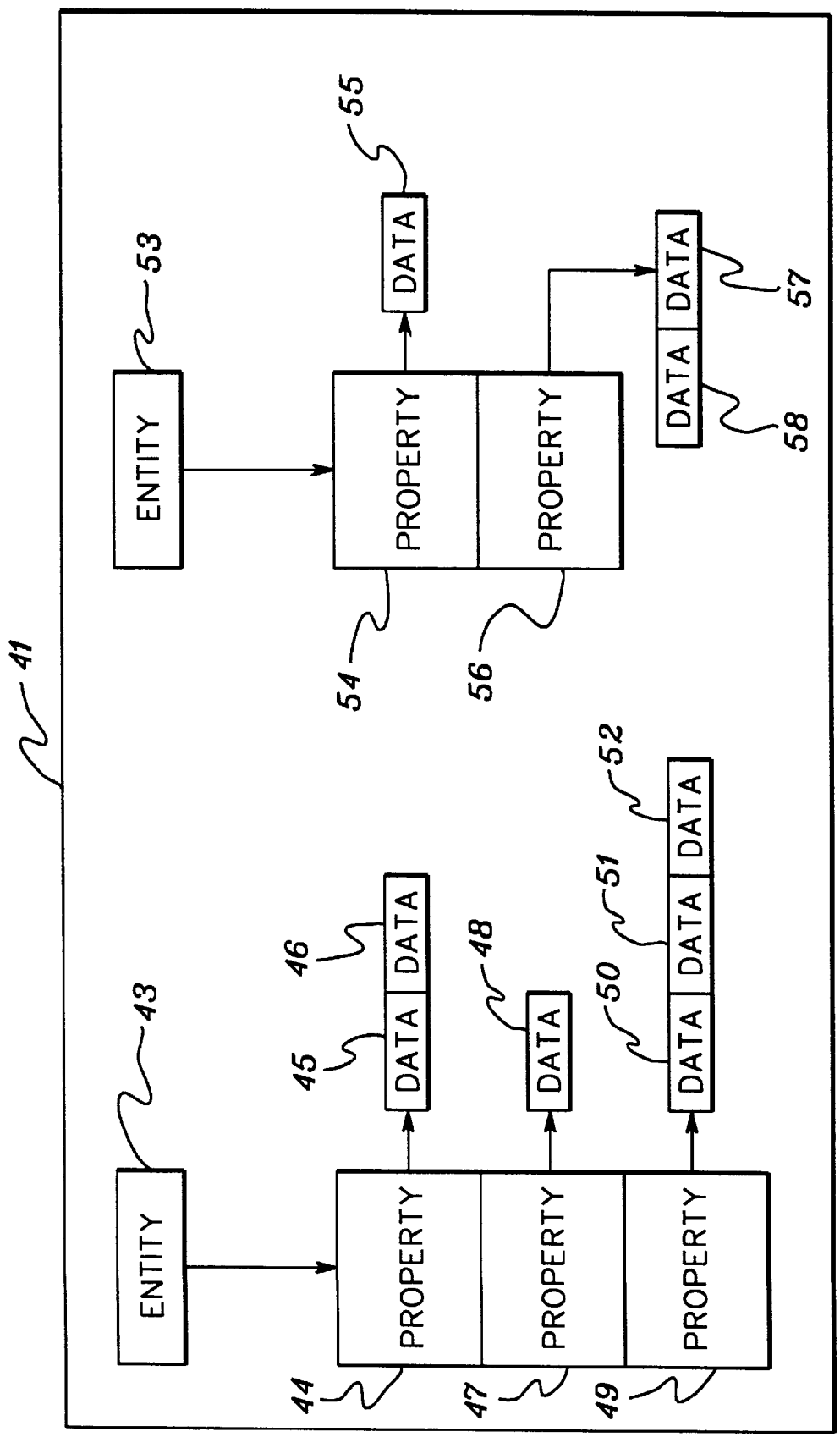
FIG. 7 illustrates one example of an embodiment of data within the database of the core layer accordance with the principles of the present invention.

FIG. 7 illustrates the concept that each piece of data in the database is associated with a given PROPERTY and a given ENTITY. In this document, it will be necessary to refer to certain combinations of ENTITYs and PROPERTYs. The construction <entity name>_<property name> (e.g.: IGNORE_IGNORETIME) will refer to a database entry with an entity equal to <entity name> and a property equal to <property name>.

In addition to ENTITYs and PROPERTYs, the database, 41, in SYSTEMWatch AI-L also has these additional features:

1. Host Information

Each piece of data in database, 41, automatically has host information associated with it. Thus, as data is stored in the database, the database automatically associates the host from which the data originated from. This is because in SYSTEMWatch AI-L, data is "owned" by the host from where the data originated. Other hosts may request a copy of the data since SYSTEMWatch AI-L has communications capabilities. Some data may be stored in a central location (e.g.: a SYSTEMWatch AI-L console) if it is relevant to multiple computers. Because each piece of data has host information associated with it, a SYSTEMWatch AI-L console can conslidate data from multiple hosts.

2. Time Information

Each piece of data in database, 41, has a time field associated with it. The time field by default has the last time the data was updated, but SYSTEMWatch AI-L provides a mechanism of changing the time field so its possible to store some other time in the field.

3. Name

Each piece of data in database, 41, has a key field which is called the name field. A name field must be unique for a given ENTITY, PROPERTY, and host (the name of a computer). Thus, within an ENTITY and PROPERTY used for tracking computer processes, the name field might be the process id since process ids are unique on each computer, so by specifying the ENTITY name, PROPERTY name, and host name, the name field forms a unique key to locate the data.

4. Value

Of course, a database stores data. In SYSTEMWatch AI-L, the term value refers to the data stored in the database.

In one example, database, 41, is currently implemented as a relational database: One table is used for describing ENTITYs. This table is used to associate ENTITYs with PROPERTYs. Another table is used for describing PROPERTYs. Finally, another table holds the information, which can be located by providing an ENTITY name, PROPERTY name, and the name field of the data. This table also contains the associated host and time information.

In another embodiment, database, 41, can also be implemented with a database which is object oriented, i.e, a database which supports the ability to inherit data and methods from super and sub classes.

Additional requirements of database, 41, used in the core is that the database must support certain query operations and certain set operations. Specifically, the query operations supported by the database include:

1. regular expression matching in queries.
2. creation time or update time query, i.e., searching for a data item based upon the time the data was stored in the database or based on the time the data was last updated in the database.
3. host of origin in queries, i.e., searching for a data item based on the host which created the data.
4. time comparison query, i.e., searching for data based upon a time comparison. Note: SYSTEMWatch AI-L stores its time in a manner similar to the UNIX operating system. That is to say, all time is converted to seconds elapsed since the beginning of UNIX time. The advantages of using this method is that time comparisons are easily made, and a time plus an interval can be added to obtain a future time.

The set operations which database, 41, supports include:

1. set intersections (ANDs)—given 2 or more sets of data, return the elements present in all sets.
2. set union (ORs)—given 2 or more sets of data, return the elements in all sets.
3. set exclusion (NOTs)—given a first set and a second set, return elements in the first set which are not elements of the second set.

Core Layer Description—The Expert System

The second element of the core layer is an expert system, 40, which is used for problem detection and action initiation. The expert system, 40, is a forward chaining rule based expert system using a rule specificity algorithm. When SYSTEMWatch AI-L client, 13, is started, the expert system contains no rules. Rules are declared and incorporated into the core layer. Rules support both the IF-THEN rules as well as IF-THEN-ELSE rules. The rules used in SYSTEMWatch AI-L permit assignments and function calls within the condition of the rule. Additionally, SYSTEMWatch AI-L expert system, 40, also has the following features:

a. Rules can declare variables. All variables declared within a rule are static variables.
b. Rules can have an initialization section. The initialization section contains actions which must be performed only once, and before the rule is ever tested. It can, for example, contain a state declaration and an interval declaration (states and intervals are described below). It may contain variable declarations for variables used by the rules, and it may contain code to do a variety of actions.
c. Rules can have, for instance, an INTERVAL and a LASTCHECK time. In accordance with the principles of the present invention, in order for a rule to be eligible for testing by the expert system, at the time of testing the clock time must be equal to or greater than the LASTCHECK time plus the INTERVAL time. The LASTCHECK time for each rule is set to the clock time whenever a rule is actually tested. This way, the INTERVAL specifies the minimum amount of time which must elapse since the last time a rule was checked before the rule becomes eligible for testing again.
d. The expert system and its rules have a state property. One example of the possible states is described below. Under expert system, 40, in order for a rule to be eligible for testing, the rule's state must equal the expert system's state. All rules except one must declare a state for the rule in its initialization section. The one rule without such a declaration is a rule used by expert system, 40, to switch it into the DATA state. Other rules are responsible for managing the transition from DATA to DATA2, and from DATA2 to EXCEPT. These states are described below:

DATA:
The data state is assigned to rules which gather raw data from the computer system. Examples of such rules would be rules which gather the amount of free space remaining on a file system, or the amount of CPU time consumed by a process. SYSTEMWatch AI-L contains a series of rules responsible for switching states, and those rules ensures that rules with the DATA state are eligible to be tested before rules with a DATA2 or EXCEPT state.

DATA2:
Sometimes, a rule which performs problem detection or a rule which initiates an action requires data which can only be computed after certain raw data is gathered in the DATA state. Although the rule can compute that information directly, if that computation is necessary for a variety of rules, it is more efficient to ensure that the computation is performed only once. The DATA2 state is assigned to rules which perform this intermediate level calculation. The rules responsible for switching states ensure that DATA2 state rules are eligible for testing after DATA state rules, but before EXCEPT state rules.

EXCEPT:
The EXCEPT state is assigned to the remaining rules, which are used to perform problem detection and action initiation. The rule responsible for switching states ensures that EXCEPT state rules are eligible for testing only after both DATA and DATA2 state rules are tested. However, after the EXCEPT state rules are tested, the state is reset to the DATA state, and the cycle resumes.

e. Each rule in the expert system also has a ONCE property. ONCE defaults to true, but can be set to false on a per rule basis by making the appropriate declarations in the initialization section of the rule, or the THEN clause, or the ELSE clause of the rule. In SYSTEMWatch AI-L, a rule is not eligible for testing by the expert system if the ONCE property for the rule is true, and if during this pass through the expert system, the rule has previously been tested true.

Figure 8A:
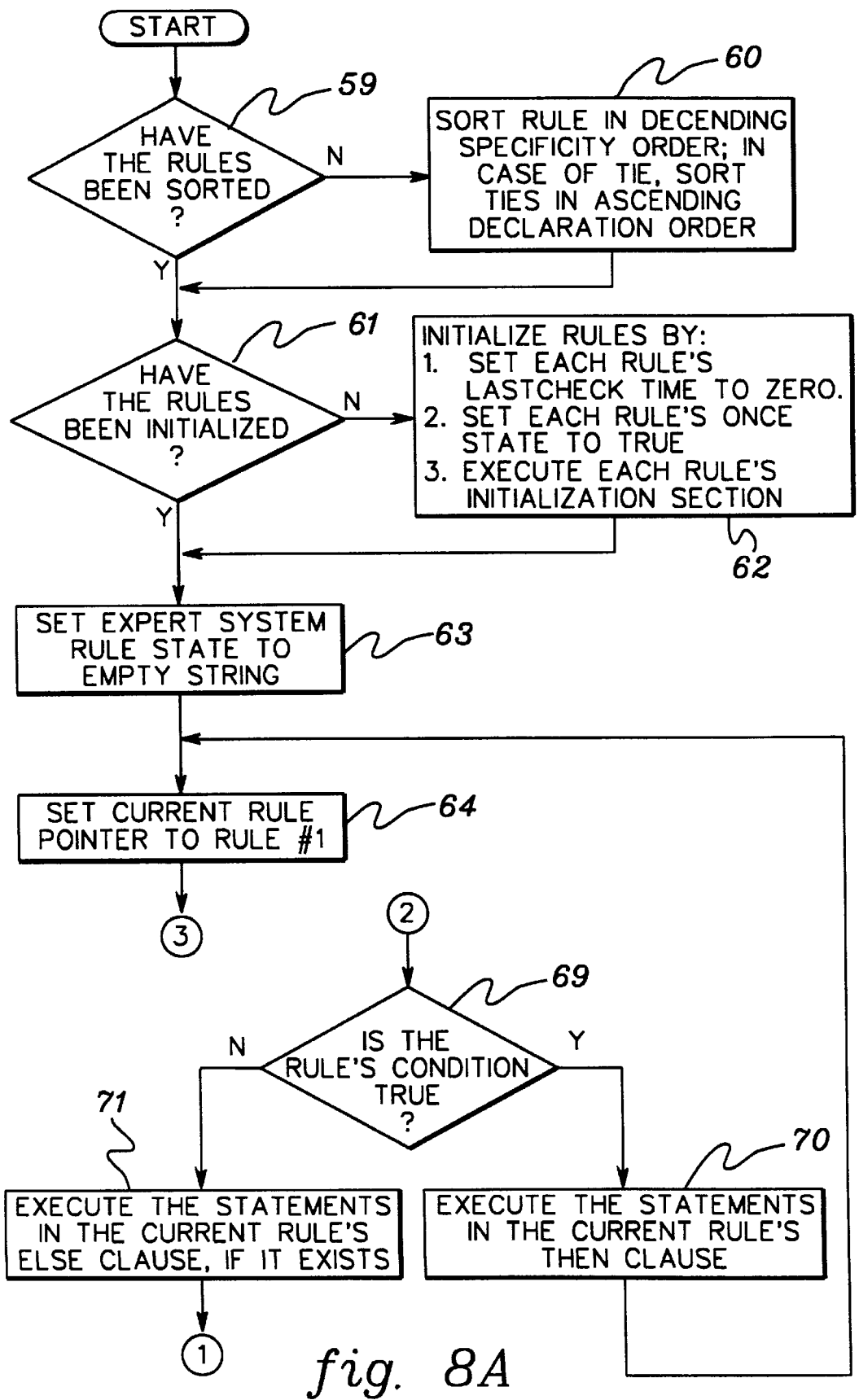
FIGS. 8a–8b illustrate one embodiment of the operation of the expert system found in the core layer of SYSTEMWatch AI-L.
Figure 8B:
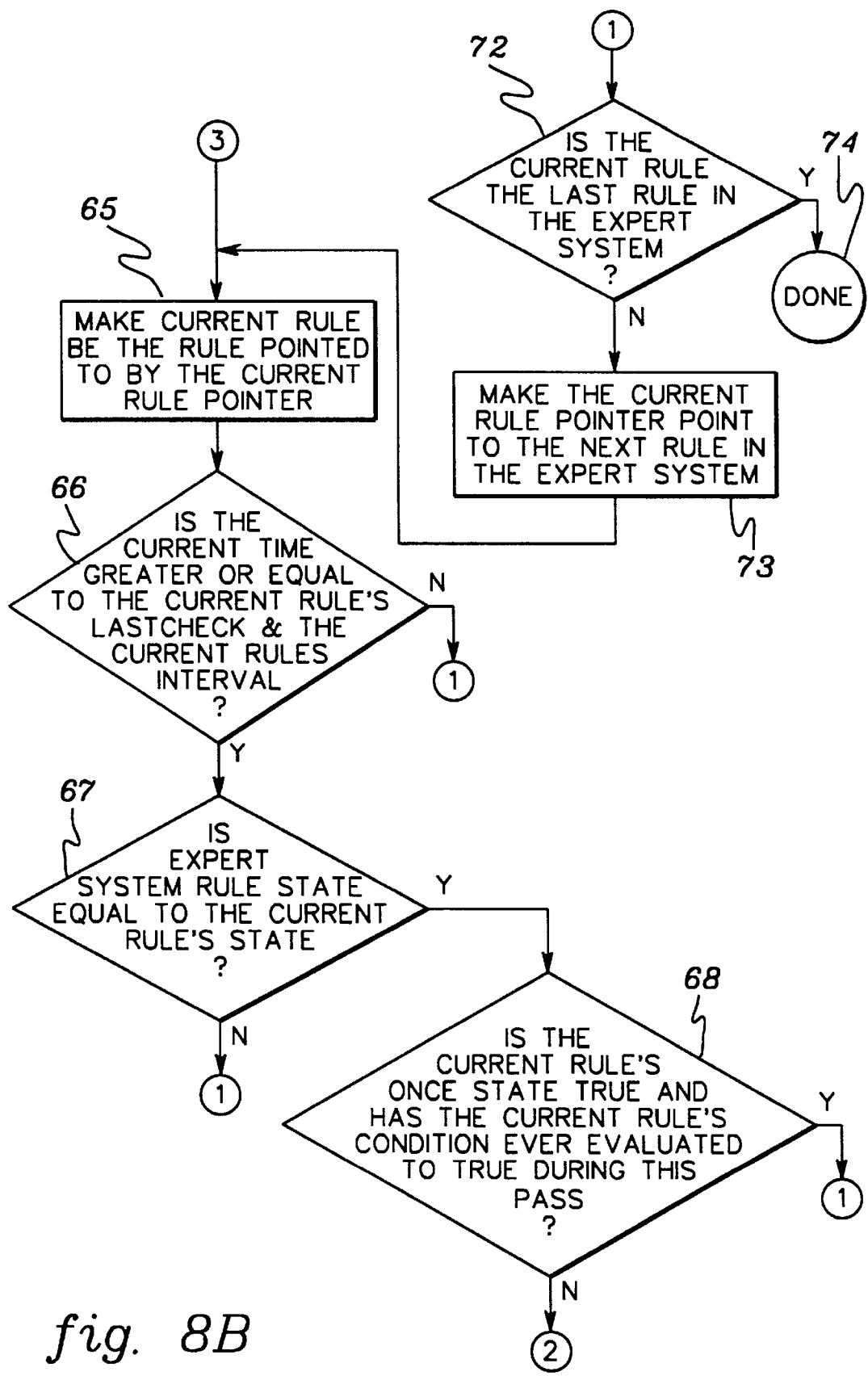

After all the rules are declared, the expert system is in a state where it is ready to test rules. SYSTEMWatch AI-L forces the expert system component of the core layer to run through its rules whenever the execRules function is called. As described later, the SYSTEMWatch AI-L client, 13, and 14 SYSTEMWatch AI-L console, 21, each call a execRules function in their main loop. As shown in FIGS. 8a–8b, in one embodiment, the expert system functions as follows:

First, if the rules have not been sorted, INQURY 59, "Have the rules been sorted?", the expert system reorders the rules by sorting them in specificity order, STEP 60. Rules are ranked in their order of specificity, with the most specific rules ordered before the least specific rules. Specificity is the total number of comparison operators (less than, less than or equal to, equal to, greater than, greater than or equal to, not equal to) and logical operators (AND, OR, NOT) contained within the boolean expression used as the test in the rules. For example, consider these boolean expressions:

TABLE 2

| Boolean Expression | Specificity |
| --- | --- |
| A AND NOT B OR (C == D) | 4 |
| (A == B) && NOT C | 3 |
| (A == B) && C | 2 |
| A == B | 1 |
| TRUE | 0 |

If during the sorting, a group of rules has the same specificity, that group is sorted in declaration order, with the earlier declared rule ordered before a later declared rule. The reordering of the rules is only done once, during the first time the execRules function is called.

If this is the first time the execRules function is called, INQUIRY 61, "Have the rules been initialized?", the expert system also performs rule initialization by running through each rule in order, and each rule's LASTCHECK time is set to zero, ONCE state is set to TRUE, and any statements contained in the rule's initialization section are executed, STEP 62.

Subsequent to initialization or if initialization was previously performed, expert system, 40, begins testing rules in sequence. First, the expert system sets its rule state to a empty string, STEP 63. Then the expert system sets its current rule pointer to the first rule, STEP 64. It makes the current rule be the rule pointed to by the current rule pointer, STEP 65. Then, before testing the rule, the expert system checks to see if the current time is greater than the rule's LASTCHECK time plus the rule's INTERVAL time, INQUIRY 66. If so, the required interval has elapsed, and the rule is not disqualified from testing. Otherwise the rule is disqualified from testing during this pass through the rules. If the above inquiry is affirmative, INQUIRY 67, the expert system checks to see if the expert system rule state is equal to the current rule's state. If they are equal, the rule is not disqualified from testing during this pass through the rule. Otherwise the rule is disqualified. Should the expert system rule state equal the current rule's rule state, the expert system checks to see if the rule's ONCE variable is set to TRUE, INQUIRY 68. If it is, and if this rule has ever tested TRUE during the current call to the execRules function. If so, the rule is disqualified from testing during this pass through the expert system. If not, the rule is eligible for testing.

If a rule is eligible for testing, the expert system tests its condition and sets the rule's LASTCHECK time to be equal to the current time, STEP 69. The rule's LASTCHECK time is updated when the condition is tested. If the condition is true, the expert system then executes the THEN clause of the rule, STEP 70. If the condition is false, the expert system executes the ELSE clause of the rule, STEP 71, if it exists.

What happens next depends upon what happened during the rule qualification and rule testing state. If the rule was disqualified from testing, or if the rule was tested and the condition was false, the expert system checks to see if the current rule is the last rule in the expert system, INQUIRY 72. If so, the expert system pass is completed for the time being, and the execRules function returns, STEP 74. If not, the expert system sets the current rule pointer to the next rule, STEP 73, and begins the process of checking rule testing eligibility and rule checking again, STEP 75. On the other hand, if the rule was tested, and the condition was true, then the expert system sets the current rule pointer to the first rule in the expert system, STEP 64, and the expert system begins the process of checking rule testing eligibility and rule checking again, STEP 65.

Core Layer Description—Language Interperter

Returning to FIG. 6, the third element of the core layer is a mechanism for configuring and controlling the database and the expert system. One preferred embodiment of this layer is an interpreter, 39, for a high level language, said language containing a mechanism of expressing database operations, database data definitions, and expert system rules.

Core Layer Description—Communications Mechanism

Finally, the fourth element of the core layer is communications mechanism, 42. The communication mechanism, 42, used by SYSTEMWatch AI-L is based on mailboxes. Each module has its mailboxes which is used to receive incoming data and commands. In one example, SYSTEMWatch AI-L contains two modules, SYSTEMWatch AI-L client, 13, and SYSTEMWatch AI-L console, 21. Messages are sent by deliverying files to desired module's mailbox. If the desired module is on a different computer, the delivery mechanism must be able to transport a message from one computer to another.

In one example of a preferred embodiment, the communication mechanism, 42, operates by running a communications daemon on each machine which has either SYSTEMWatch AI-L client, 13, or SYSTEMWatch AI-L console, 21. A sending module delivers its message to a receiving module by passing the message to the communications daemon located on the machine where the sending module is located. Message passing is accomplished by sending messages on a TCP/IP based network using network sockets. That communications daemon then transmits the message over a computer network to the communications daemon where the receiving module is located. The communications daemon on the machine where the receiving module is located then places the message in a file in the mailbox of the receiving module.

In another example of a preferred embodiment, the communications mechanism, 42, operates by placing all mailboxes of all modules in a central location, say a certain directory on a file server. On each machine which contains either SYSTEMWatch AI-L client, 13, or SYSTEMWatch AI-L console, 21, the file server directory where the mailboxes are located is made accessible. Thus, a sending module delivers its message to a receiving module simply by writing a file into the appropriate mailbox.

Now that the client program organization has been explained, its possible to understand how the SYSTEMWatch AI-L client operates within the context of its bifurcated layers, i.e., the core and application layers. When the SYSTEMWatch AI-L client first begins, it consists of the core layer program reading a file containing a program written in the high level language which can be interpreted by the core. That program, including the 14 programs which that program will read, comprises the application layer for SYSTEMWatch AI-L client, 13. At this point, the database in the core layer has no data record definitions, and no data records. Similarly, the expert system within the core layer has no rules, variables, or routines. As the language interpreter, 39, portion of the core begins to interpret and execute the program, the first thing the program causes the core to do is to perform some housekeeping work. This work consists of ensuring that the communications mailboxes used by the SYSTEMWatch AI-L client are set up. After the housekeeping is done, SYSTEMWatch AI-L client, 13, causes the core to read in a series of files. These files are also files with programs written in the high level language. As each file is read, the routines, data record definitions, and rules expressed in each file are incorporated into the database, expert system, and language interpreter, 39, of the core.

One preferred embodiment is to split these programs into 14 parts, consisting of the following files:

1. worksets
2. configs
3. events
4. requests
5. corns
6. lib
7. alerts
8. filesys
9. files
10. swap
11. process
12. daemon
13. actions
14. ruleinit Note that if the system administrator wanted to add additional modules to detect, analyze, and respond to additional problems, he need only write a program in the high level language conforming to convention used in the other files in SYSTEMWatch AI-L and modify the application layer to read in his program(s) before the SYSTEMWatch AI-L client reads the ruleinit program.

Each of the 14 files read by the SYSTEMWatch AI-L client will now be described in detail:

1. worksets:

A program which contains database declarations and routines relating to worksets. The worksets program does not declare any rules.

A workset is a SYSTEMWatch AI-L ENTITY which is used to track groups of items for inclusion and exclusion, typically for including/excluding certain objects from being tested by the rules.

TABLE 3

| ENTITY | PROPERTY | TYPE | DESCRIPTION |
|---|---|---|---|
| WORKSET | ITEMLIST | string | Actual list of colon separated items for maintaining working sets |
| WORKSET | ADDEL | string | Contains the string ADD in case of a temporary addition record, and the string DEL in the case of a temporary deletion record. An empty string means this record is a permanent work set record. Other values are illegal. |

TABLE 3-continued

| ENTITY | PROPERTY | TYPE | DESCRIPTION |
|---|---|---|---|
| WORKSET | WORKSETNAME | string | The name of the workset that a temporary add/delete transaction references |
| WORKSET | TIMEOUT | integer | Specifies the time at which a temporary ADD action will delete an item, or at which a temporary DEL action will ADD an item back to the database. 0 identifies a permanent working set record. |

The routines declared in the workset program are the following:

TABLE 4

| NAME | FUNCTION |
|---|---|
| addItem | Takes a string and adds it to a workset if the string is not already a member of the workset. Accepts the string and a workset name. |
| addWorkSet | Adds a string of colon delimited items to a workset. If the workset does not exist, it is created. Can optionally accept a time out value, which if present means the addition is temporary, and will be deleted from the specified workset after the timeout period has expired. Accepts a hostname, workset name, a string, and optionally, a time out period. |
| checkInclExcl | Determines whether an item is on the include or exclude list of a particular workset. checkInclExcl first checks the workset for an include list. If an include list exists, and if the item is on the include list, then checkInclExcl returns the string "INCLUDE." If an include list exists and the item is not on the include list, checkInclExcl returns an empty string. If an include list does not exist, checkInclExcl then checks to see if an exclude list exists. If an exclude list exist and the item is not on the exclude list, checkInclExcl returns "INCLUDE". If an exclude list exists and the item is on the exclude list, checkInclExcl returns an empty string. checkInclExcl accepts a workset name and an itemstring. |
| checkWorkSet | Reviews workset list of items waiting to be added or deleted and executes the adds and deletes if the appropriate time has arrived. checkWorkSet does not accept any parameters. |
| delItem | Accepts an itemstring and a workset, goes through the workset and deletes every item in the itemstring from the workset, and then returns the (modified) workset. |
| delWorkSet | Accepts a hostname, a workset name, itemlist, and optionally a time out period. Deletes each item in the itemlist from the workset, and if after the deletion(s) no elements remain in the workset, delete the workset itself. If the optional time out period is provided, the deletion is temporary, and after the expiration of the timeout period, the workset is restored. |
| getProblemInterval | Accepts a problem name and searches for the workset entry with the corresponding problem name to retrieve the problem checking interval. This function usually used in the initialization section of a rule in the expert system to get the interval. |
| getWorkSet | Accepts a hostname and a workset name, and returns the itemstring containing elements of the specified workset. |
| isItem | Accepts a workset name, and an itemstring, examines whether the itemstring is contained in the workset, returning TRUE if found and FALSE if not found. |

As previously mentioned, the workset program does not contain any rule declarations.

2. configs:

A program which contains database declarations and routines relating to configurations. The configs program does not declare any rules.

In SYSTEMWatch AI-L, configuration refers to a method of assigning threshold values and other data to a particular computer. Configurations provide a mechanism by which the system administrator can change the behavior of SYSTEMWatch AI-L without having to modify the rules of the application layer. For example, suppose SYSTEMWatch AI-L contains a rule which notifies the system administrator when the load average of a computer remains above a certain threshold so that the computer is now non-responsive. This threshold number will vary across a variety of computers because a more powerful computer can remain responsive at the same load average which might cause a less powerful computer to become non-responsive. Therefore, if a particular computer site has say 10 computers of lesser power, and 2 more powerful computers, the proper way to configure SYSTEMWatch AI-L would be to specify a lower load average for the 10 weaker computers, and a higher threshold for the 2 more powerful computers.

In SYSTEMWatch AI-L configurations are specified in a text file. Thus, the system administrator can alter the threshold value used by the rules by modifying the text file containing the configuration information since after the SYSTEMWatch AI-L client has read in each of these program files, it reads the configuration file. Configurations can be specified in one of 5 formats:

CONF:<hostname>:<config parameter name>:<string>:string value:
  Which is used to associate a string value with a config parameter name of type string.

CONF:<hostname>:<config parameter name>:<num>:numeric value:
  Which is used to associate a numeric value with a config parameter name of numeric type.

CONF:<hostname>:<config parameter name>:PROBLEM:<problem name>:
  Which is used to associate a configuration parameter name with a particular problem.

CONF:<hostname>:<config parameter name>:SUBPROBLEM:<behavior 1>:
  Which is used to associate a configuration parameter name with a particular subproblem.

WORK:<hostname>:<workset name>:item1:item2: . . . :itemN:
  Which is used to associate a workset name with a list of data.

In all five formats above, the <host name> field can either be the name of a host being managed; or it could be DEFAULT, which means all hosts except those which have a specific entry. Thus, in the example above, if the threshold for the 10 less powerful computers should be 5.2 and the threshold for the 2 more powerful computers should be 7.5, the following configuration declarations would be appropriate if the 2 more powerful computers had host names of server1 and server2, the config parameter name is called UNRESP LOAD AVE:

CONF:DEFAULT:UNRESP LOAD AVE:NUM:5.2:
CONF:server1:UNRESP LOAD AVE:NUM:7.5:
CONF:server2:UNRESP LOAD AVE:NUM:7.5:

The database declarations made in the configs program are, for instance, the following:

TABLE 5

| ENTITY | PROPERTY | TYPE | DESCRIPTION |
| --- | --- | --- | --- |
| CONFIG | VALTYPE | string | The data type for a particular configuration parameter |
| CONFIG | STRINGVAL | string | The string value for a particular configuration parameter |
| CONFIG | NUMVAL | float | The numeric value for a particular configuration parameter |
| CONFIG | PROBLEM | string | This value indicates the general class of problem type of configuration described by this value. |
| CONFIG | SUBPROBLEM | string | This value indicates a more specific measurement of subproblem as it relates to more general configurations described by this value. |

The routines declared in the configs program are, for example, the following:

TABLE 6

| NAME | FUNCTION |
| --- | --- |
| declConfig | This routine declares a configuration entry. It accepts a host name, configuration parameter name, a value type, a problem name, and a subproblem name. |
| delConfig | This routine deletes from the database a particular configuration record. It accepts a host name and a configuration parameter name. |
| getConfigStr | This routine returns the string value of a configuration parameter name if the configuration parameter name is of string type. It accepts a host name and a configuration parameter name. |
| getConfigNum | This routine returns the numeric value of a configuration parameter name if the configuration parameter name is of numeric type. It accepts a host name and a configuration parameter name. |
| getConfigType | This routine returns the type of a configuration parameter name. It accepts a host name and a configuration parameter name. |
| getConfigProblem | This routine returns the problem associated with a configuration parameter name. It accepts a host name and a configuration parameter name. |
| readConfigFile | This routine reads a file which contains configuration and workset declarations. It accepts a file name. |
| setConfig | This routine sets the value of a particular configuration parameter name. It accepts a hostname, a configuration parameter name, and a value. |

As previously mentioned, the configs program does not declare any rules.

3. events:

A program which contains database declarations and routines which implements the SYSTEMWatch AI-L event handler, which allows SYSTEMWatch AI-L to execute functions either at specified times or periodically. The events program does not declare any rules.

The events program defines an ordered list of records, each describing a type of event. The order is such that the next event to be executed is first on the list. Each record contains the next event time, the function to be executed at that event, and two optional values, viz., the number of instances that event is to be executed, and the interval between those instances. To add an event, an event record is added to the database.

SYSTEMWatch AI-L will check for events whenever the checkEvent function is called. This function call should be placed in the main loop of the SYSTEMWatch AI-L client and the SYSTEMWatch AI-L console.

The database declarations made in the events program are, for instance, the following:

TABLE 7

| ENTITY | PROPERTY | TYPE | DESCRIPTION |
|---|---|---|---|
| EVENT | EVENTNAME | string | Unique generated name for a scheduled event. |
| EVENT | FUNCTION | string | Name of function to be executed that the time of the event. (Function name only!-do not include any command line arguments for the function) |
| EVENT | ALARMTIME | integer | The alarm time after which the event gets executed |
| EVENT | INTERVAL | integer | The minimum time between event repetitions |
| EVENT | REPEATS | integer | Number of times the event gets put back onto the event queue, after the currently scheduled event has been executed. |

The routines declared in the event program are, for example, the following:

TABLE 8

| NAME | FUNCTION |
|---|---|
| addEvent | Given a function name, a time period, and an optional repetition factor, addEvent schedules SYSTEMWatch AI-L to execute the function named at a time equal to the present time plus the time period. If the optional repetition factor is given, the function is scheduled that many times, each time differing from the previous event time by the time period. |
| checkEvent | Checks the event list to see if any events are ready to execute. If so, the ready events are executed. |
| delEvent | Accepts a function name and removes all occurrences of that function from the event handling system. |
| getNextEvent | Returns the clock time to the next event waiting. |

As previously mentioned, the event program does not declare any rules.

4. requests:

A program which contains two routines used by SYSTEMWatch AI-L for communication between the SYSTEMWatch AI-L client and the SYSTEMWatch AI-L console. The request program only contains two function declarations. The request program provides a higher level interface to the communications system by performing some message formatting and calling the communication functions declared in the corns program discussed below.

The routines declared in the requests program are, for example, the following:

TABLE 9

| NAME | FUNCTION |
|---|---|
| request | Accepts a hostname, module name, a function name, and arguments to the function named. Sends a message to request the module on the host specified to execute the named function with the specified arguments. |
| requestReport | Accepts information which identifies a particular report and a particular module which requested the specified report. Formats a string containg a report request, and sends the resulting string to the specified module. |

5. coms:

A program which contains routines relating to a SYSTEMWatch AI-L supplemental communications system.

The coms program does not contain database declarations nor rules.

The routines declared in the coms program are, for example, the following:

TABLE 10

| NAME | FUNCTION |
|---|---|
| manageMe | Given a host name, a module name, and a optional string, adds a SYSTEMWatch AI-L client to the console list by calling the addWorkSet routine. Also sends a "notifyMe" message unless the optional string is equal to "NO RESPONSE". |
| notifyMe | Accepts a hostname and a module name and adds a process to the liveconsole list. If a process is not on the approved console list, this function does nothing. |
| sendMultiString | Accepts one or more hostnames ("process list"), a module name, a message, and a mailbox name and sends the message multiple times to the modules specified on the process list specified using the mailbox specified. |
| getMultiData | Accepts a workset which contains a list of processes and an entity name. This function requests data from each of the processes on the list of processes. The data requested is all the data contained in the specified entity. |
| multiRequest | Accepts a function name, parameters for the function, and a list of at least one pair of hostname & module name; Sends a message to each of the hostname/module name combinations requesting that they execute the specified function with the specified parameters. |
| sendMultiManageMe | Sends multiple manage me messages to the SYSTEMWatch AI-L consoles on the console list. |
| sendMultiNotifyMe | Sends multiple notify me messages to SYSTEMWatch AI-L clients on the client list. |
| sendData | Accepts a host name, module name, and entity name; sendData sends all the data comprising the specified entity to the specified host.. |

6. lib:

A program which contains a series of miscellaneous routines. The libs program does not contain any database declarations nor rule declarations.

The routines declared in the lib program are, for example, the following:

TABLE 11

| NAME | FUNCTION |
|---|---|
| fileUser | Accepts a file name and returns a colon delimited list of users which are using the specified files. |
| istr | Accepts a floating point number and returns a string which contains the integer portion of the floating point number. |
| ls | Accepts an optional path name. If the path name is specified, ls returns a directory hosting of the specified path. If no path name is specified, ls returns the directory listing of the current working directory. |
| mkDirTree | Accepts a directory name and creates all the necessary directories to create the directory name specified. Thus, if a file system only contains the root directory (/), and mkDirTree is called with the directory name of /A/B/C, mkDirTree creates the following directories: /A;/A/B; and /A/B/C. |
| procAlive | Accepts a process id and determines whether the process id specified corresponds to a process in the process table. |
| readSwap | Obtains the following information from the virtual memory subsystem:<br>swapused-the amount of swap space used on the system.<br>swaptotal-the total amount of swap space allocated on the system.<br>swapavail-the remaining amount of swap space<br>swapperc-the percentage of the allocated swap is used. |
| systemInOut | Accepts a command name and an input string. Executes the command named using the specified input string as the command's input. Returns a string equal to the output of the command. |

TABLE 11-continued

| NAME | FUNCTION |
| --- | --- |
| systemOut | Accepts a command name, executes the command specified, and returns a string equal to the output of the command. |
| lockProcess | Accepts a directory name and a filename. lockProcess is used when you only want one process of a particular kind to be running at any one time. It guarantees process uniqueness by first testing whether the lock file exists, and whether it has the current process id in it. If it has a process id in it and that process is still alive, it returns with a warning message. If the process id in the file is not a live process, lockProcess writes its own process id into the file. lockProcess then re-reads the file, and if it finds its own process id in the file, lockProcess returns without error. Otherwise, an error message is generated. |

7. alerts:

A program which contains database declarations and routines used in a SYSTEMWatch AI-L alert handling system, which is used to manage problem alerts and their associated actions. The alerts program does not declare any rules.

The SYSTEMWatch AI-L alert handling mechanism provides a method of presenting problem notification to the system administrator. There are several concepts used within the alert handling mechanism:

1. PRIORITY: Each alert within SYSTEMWatch AI-L has an associated priority, which is used to determine the seriousness of the detected problem. In one embodiment, SYSTEMWatch AI-L uses, for example, 5 levels of priorities comprising of FYI (least serious), NOTIFY, PROBLEM, FAILURE, and CRITICAL (most serious).

2. ESCALATION: After an alert has been created, SYSTEMWatch AI-L provides a technique of automatically changing the PRIORITY of an alert over time. This allows SYSTEMWatch AI-L to promote or demote a particular alert's PRIORITY over time. The promotion/demotion process is known as an escalation scheme. SYSTEMWatch AI-L supports the use of multiple and user-defined escalation schemes. In SYSTEMWatch AI-L, an escalation scheme is defined with a name. The escalation scheme can be associated with an alert by referencing the escalation scheme's name. SYSTEMWatch AI-L stores the escalation schemes in the configuration file.

3. TIME OUT: After an alert has been created, or after an alert has been escalated to a particular state, the technique of the present invention provides for the timing out the alert. A timed out alert is cleared from the alert system.

4. CLEAR: After an alert has been created, SYSTEMWatch AI-L provides a mechanism for clearing the alert, which removes it from the active alert pool. Cleared alerts, however, remain within SYSTEMWatch AI-L for some period of time. That period of time is called the reset time, during which if the condition which causes the alert to be generated occurs, the alert will not be posted. Once the reset time period has elapsed, the alert is completely removed from the alert handling mechanism, and if the condition which can cause the alert to be generated reoccurs, a new alert is posted. Each alert can have a different reset time.

5. IGNORE: After an alert has been created, SYSTEMWatch AI-L provides a mechanism for ignoring the alert, which, like clearing an alert, removes it from the active alert pool. Like clearing, the ignored alert is also kept within the alert handling mechanism, and has an associated time period called an ignore time, during which if the condition reoccurs, the alert will not be posted. Unlike the CLEAR mechanism, however, the IGNORE mechanism does not necessarily have a fixed ignore time for each alert: Rather, SYSTEMWatch AI-L supports an ignore scheme similar to the escalation scheme. In the ignore scheme, SYSTEMWatch AI-L remembers how many times a particular alert has been ignored. By specifying an ignore scheme, it is possible to vary the length of the ignore period depending on how many times that particular alert has already been ignored. The typical application for this is to increase the ignore period as the number of ignore actions for a particular alert has been taken. This way, SYSTEMWatch AI-L can "learn" from the actions of the system administrator and interrupt the system administrator less frequently with an alert that he has previously ignored. In SYSTEMWatch AI-L, an ignore scheme is defined with a name, and thereafter, the ignore scheme can be applied to any alert by referencing its name. SYSTEMWatch AI-L stores the ignore schemes in the configuration file.

6. ALERT ID v. ALERT REFERENCE NUMBER: Each alert in SYSTEMWatch AI-L can be identified by an alert id, which, when combined with a host name and a module name, uniquely identifies an alert, or via an alert reference number, which, when combined with a host name and a module name, uniquely identifies an alert, but only during a specific time period. In other words, the alert id is an unique number generated by SYSTEMWatch AI-L as each alert is created. On the other hand, in order for the system administrator to refer to an alert without having to type a large multi-digit number, SYSTEMWatch AI-L creates a smaller number (in one example, typically 2 digits) which points to an active alert. In order to maintain the alert reference number at 2 digits, SYSTEMWatch AI-L automatically reuses the alert reference numbers over time, so an alert reference number can only uniquely identify an alert within a certain window of time.

7. ALERT NAME and ALERT INSTANCE NAME: In addition to the alert id and the alert reference number described in the paragraph above, each alert in SYSTEMWatch AI-L can also be identified through a combination of two items, specifically the alert name and the alert instance name. The alert name identifies the class of problem which triggered the alert while the alert instance name identifies the object involved in the problem. For example, if the/usr file system reaches 90% capacity, and the fact that a file system reached 90% capacity is defined as a problem named FSFYI, then the alert name in this case is FSFYI and the alert instance name is/usr.

8. OWNER: SYSTEMWatch AI-L allows a system administrator to optionally assign owner(s) to a problem identified in an alert. This is used when the system administrator decides that someone must manually resolve the problem. Once an alert has at least one owner, the alert ceases to escalate or time out. The alert remains active within the alert handling system, and will not be removed until it is cleared.

9. PROBLEM HIERARCHIES and UNIQUE LISTS: Alerts in SYSTEMWatch AI-L may be arranged in problem hierarchies. Problem hierarchies are used to prevent a problem from triggering several overlapping alerts. For example, suppose three problems were defined as:

TABLE 12

| Problem | Description |
|---|---|
| FSFYI | A file system reached 90% capacity |
| FSWARN | A file system reached 95% capacity |
| FSALERT | A file system reached 98% capacity |

If a particular file system reached 98% capacity, the 3 rules which detect the FSFYI, FSWARN, and FSALERT problems would all attempt to post alert of alert type FSFYI, FSWARN, and FSALERT for the same alert instance (in this case, the file system name). However, this is redundant What is needed is just one single alert of type FSALERT. To resolve this problem SYSTEMWatch AI-L allows problems to be grouped into hierarchies. Once a problem hierarchy has been defined, SYSTEMWatch AI-L will automatically ensure that only the alert with the most severe priority of a particular hierarchy will survive. Problem hierarchies are specified in the SYSTEMWatch AI-L configuration. In SYSTEMWatch AI-L, problem hierarchies are called unique lists.

With an understanding of the above information, the operation of an alert mechanism in accordance with the principles of the present invention can now be described. When a rule detects a problem, the rule will post an alert to the alert mechanism by calling the function addAlert. During the SYSTEMWatch AI-L client's main loop, the SYSTEMWatch AI-L client will call the function checkAlert to handle alert escalation and alert clearing.

When the addalert function is called, SYSTEMWatch AI-L performs 5 validation tests before a new alert is created. In the description below, the term candidate alert refers to the alert given to addAlert for posting. The validation tests are the following 1. Unique List Check In order to prevent a severe problem from posting related and less severe alerts, addAlert queries the database to see whether there is an existing alert with the same alert instance name and an alert name which occupies a higher priority position in the same unique list as the candidate alert If such an alert exists, the candidate alert is rejected and not posted.

2. Duplicate Alert Check

In order to prevent the problem of posting multiple identical alerts at different times, addAlert queries the database for an alert with the same alert name and alert instance name. If such an alert exists, the candidate alert is rejected and not posted.

3. Ignore List Check

In order to prevent a problem of posting a new alert when the problem is being ignored, addAlert queries the database for a corresponding entry of IGNORE_IGNORETIME. If such an entry exists, addAlert compares the current clock time with the value of the entry found. An alert candidate will be rejected if the dock time is less than or equal to the value of the entry found because that condition means that the alert is being ignored at this time.

4. Clear List Check

In order to prevent a problem of posting a new alert when the problem is being cleared, addAlert queries the database for an corresponding entry of ALERT_CLEARED. If such an entry exists and its value is true, then addAlert queries the database for an entry of ALERT_CLEARTIME and compares its value against the clock time. An alert candidate will be rejected if the clock time is less than or equal to the value of the entry found because that condition means that the alert was cleared and the current time is within the reset time period.

5. Lower priority check

While the unique list check prevents a severe problem of also posting less severe alerts, if a more severe problem occurs after a less severe problem belonging to the same unique list has already posted an alert, the alert which corresponds to the less severe alert must be removed before the more severe alert is posted. Thus, addAlert queries the database for an alert with the same instance name and an alert name which is of a lower priority on the same unique list as the candidate alert. If such an alert is found, it is deleted.

If the alert candidate passes the 5 validation tests described above, the alert will be posted. Posting an alert is a multistep process which involves the following steps:

1. Create Alert addAlert will create an alert in the database with the alert name and alert instance name corresponding to the candidate alert.

2. Add information to alert addAlert will store descriptive information into the alert.

3. Assign starting priority addAlert will query the configuration information stored in the database to retrieve the problem priority associated with an alert with the same alert name as the candidate alert and assign the same priority to the alert.

4. Assign escalation scheme addAlert will query the configuration information stored in the database to retrieve the escalation scheme associated with an alert with the same alert name as the candidate alert and store the same with the alert.

5. Assign ignore scheme addAlert will query the configuration information stored in the database to retrieve the ignore scheme associated with an alert with the same alert name as the candidate alert, and store the same with the alert.

6. Assign available actions addAlert will query the configuration information stored in the database to retrieve the available actions associated with an alert with the same alert name as the candidate alert, and store the same with the alert.

7. Assign default actions addAlert will query the configuration information stored in the database to retrieve the default actions associated with an alert with the same alert name as the candidate alert, and store the same with the alert.

8. Update SYSTEMWatch AI-L consoles addAlert will allow the alert to be communicated to the attached SYSTEMWatch AI-L consoles by calling updateNetworkAlert.

9. Save Alert to Disk addAlert will save the alert to a disk file.

10. Execute Default Action addAlert will execute any default actions associated with the alert.

When the checkalert function is called as part of the main loop of the SYSTEMWatch AI-L client and the SYSTEMWatch AI-L console, alert escalation and alert clearing are performed. Alert escalation is performed by executing the following steps for each of the alerts which has not been cleared, ignored, or assigned an owner:

1. Querying the database to retrieve the "escalation item" of an alert with the same alert name and with a priority equal to the alert's current priority. This information consists of the current priority, a time period, and a new priority.

2. If the time the alert has been in the current priority state is larger than or equal to the time period above, change the alert's priority according to the escalation scheme to the new priority.
3. If the new priority is zero, then clear the alert by removing the alert from the active alerts and place the alert on the clear list for the rest time period.
4. Determine whether any default action(s) is registered from this alert name and priority and the current time. If such a default action is registered, execute such actions by calling the doAction function.

Alert clearing is performed by executing the following steps for each of the alerts:

1. Query the database for an alert to see if it has a corresponding entry of ALERT_CLEARED. If so, and if the value is true, then perform step 2. Otherwise, the process is done for this alert.
2. Query the database and retrieve a corresponding entry of ALERT_CLEARTIME. Check its value against the clock time. If that time is less than or equal to the clock time, this means the alert has been cleared, and the reset time has expired, so remove the alert.

Ignoring an alert is accomplished by performing the following steps:

1. If this is the first time this alert has been ignored, store to the database a corresponding entry of IGNORE_IGNORECOUNT with value 0.
2. Query the database for an entry of IGNORE_IGNORECOUNT associated with this alert.

Increment the value by one and store it back into the database.

3. Query the database for the configuration of the associated ignore scheme for this alert name and alert instance.
4. Get the Nth entry in the ignore scheme, where N is the value of the updated IGNORE_IGNORECOUNT stored in step 2 and store into the database a corresponding entry of IGNORE_NEXTIME a value equal to the current time plus the time interval of the Nth entry. Note, if the IGNORE_IGNORECOUNT value is greater than the number of entries in the ignore scheme, put a very large number into the IGNORE_NEXTIME. This effectively makes the ignore period infinite for all practical purposes, thereby preventing the alert from reoccurring.

Note that escalation schemes and ignore schemes can be different for each managed computer by including computer specific information in the configuration database.

The alerts program contains the following database declarations:

TABLE 13

| ENTITY | PROPERTY | TYPE | DESCRIPTION |
| --- | --- | --- | --- |
| ALERT | PRIORITY | string | Describes priority of problem with the following words: FYI, NOTIFY, PROBLEM, FAILURE, CRITICAL |
| ALERT | PROBLEMAREA | string | Describes the general nature of the problem. |
| ALERT | SHORTDESCRIPTION | string | Provides a brief overview of the problem. |
| ALERT | DETAIL | string | Provides a detailed overview of the problem. |
| ALERT | RECOMMENDEDFILE | string | Offers recommended solutions to problem, including useful system data. |
| ALERT | RECOMMENDFLAG | integer | TRUE if RECOMMENDFILE exists. |
| ALERT | HISTORYFILE | string | A cumulative problem history, save in an outside file. The filename is stored in this field. |
| ALERT | HISTORYFLAG | string | TRUE if HISTORYFILE exists and is a valid file name. |
| ALERT | ACTIONSAVAILABLE | string | Provides information about actions available for problem type. Different actions are separated by colons, such as 1stAction:2ndAction. |
| ALERT | ACTIONSTAKEN | string | Provides information about action in progress and previously taken in this alert. It is the action responsibility for maintaining this field. Multiple actions are separated by colons. |
| ALERT | ACTIONTIME | integer | Contains a time stamp for when the action should review the current action of this Alert. This field is under the control of the action. |
| ALERT | CREATTIME | integer | Time stamp of when the alert was created. |
| ALERT | CLEARED | integer | If a record has the cleared flag set to TRUE, then an alert will not be displayed as a live alert. However, it is still tracked in the database to avoid immediate realerts of the same problem. |
| ALERT | CLEARTIME | integer | Time at which the cleared alert is automatically removed from the list and a new problem can be generated. |
| ALERT | ESCALATION | string | Specifies name of escalation mechanism to use for this alert. |
| ALERT | ESCALTIME | integer | Time of next escalation check. |
| ALERT | OWNER | string | This is a list of people who claim ownership for the problem and are thereby acknowledging the problem's existence, which stops problem escalation. |
| ALERT | PROBLEMID | string | Contains problem id:host:entity. For example: FSWARN:HOST1:/dev/sd0a. Used for tracking if a problem has been previously seen and whether to realert. |
| ALERT | NOTIFY | string | Notify gets set to ADD, OWNER, or RECOMMEND depending what value |

TABLE 13-continued

| ENTITY | PROPERTY | TYPE | DESCRIPTION |
|---|---|---|---|
| | | | changed. Multiple notifications are allowed by a colon delimiting the notification items. |
| ALERT | PROCESS | string | Specifies the owning and originating process in the HOST:MODULE format. The PROCESS field with the ALERTID uniquely specifies a process. It is the originating processes' responsibility to maintain unique ALERTIDs. By default, any PROCESS specified by just the HOST will default to the SYSTEMWatch AI-L client module. |
| ALERT | ALERTID | integer | An identification number unique to the originating process specified in the PROCESS property. |
| ALERT | REFNUM | integer | Temporary reference number that is used on each local host to identify a particular alert from the alert displays without having to type the whole alert name. |
| IGNORE | IGNORECOUNT | integer | Number of times the user requested to ignore the problem. |
| IGNORE | NEXTTIME | integer | Describes the next time that particular alert instance may reappear if the particular problem is noticed again. |
| REFNUM | REFNUM | integer | Contains an Alert Reference Number allocated to a particular local alert. |

The routines declared in the alerts program are the following:

TABLE 14

| NAME | FUNCTION |
|---|---|
| appendAlerts | Accepts a file name and saves all non-cleared alerts to the file specified. |
| getAlertRefNum | Accepts an alert id, assigns an alert reference number to the alert id, and returns that alert reference number. |
| getAlertHostModIdRefNum | Accepts an alert reference number, and returns the host name, module name, and alert id associated with that alert reference number. |
| checkAlertRefNum | Traverses all alerts and assigns an alert reference number to any alerts without an associated alert reference number. |
| updateNetworkAlert | Accepts an "old alert" and a "new alert", causes the new alert to replace the old alert (e.g.: delete the old alert; add new alert) |
| setNotify | Accepts an alert, and a notification event, and sets the alert notification flag for the specified notification event. |
| doNotify | Accepts an alert, checks to see whether the alert has any notification flags set, and if so, performs the appropriate alert notification action. |
| delAlerts | Accepts an alert and a scope. Scope can be local or network wide. Deletes the alert locally only (if scope is local), or deletes the network both locally and network wide. |
| getAlertName | Accepts a host name, module name, and alert id, returns a database key (the name) to the alert. |
| clearAlert | Accepts a host name, an alert id number, and a module name; deletes the alert specified. |
| ignoreAlert | Accepts a host name, an alert id number, and a module name; ignores the alert specified. |
| checkProblem | Accepts a problem and determines whether the problem should be reported. A problem will be reported if it has an alert which is already in the database, or if it has been specifically excluded, or if it has been ignored. |
| addOwner | This function is used to add an owner to a particular alert. |
| getEscalTime | Accepts an escalation scheme name and a current priority, returns the amount of time the escalation scheme specifies should elapse before an alert with the current priority should transition to the next schedule priority. getEscalTime returns this information specifically for the host on which the function was made if there is a configuration entry for this host, otherwise, it uses the escalation scheme for the "DEFAULT" host. Returns 0 if no escalation remains to be scheduled. |
| getEscalPriority | Accepts a priority and an escalation scheme name, returns the next priority level that the specified escalation scheme will transition to with a start state equal to the specified priority. |
| geAlertNum | Generates an alert identification number. The alert identification number is unique for a given host and module. |
| superceedAlert | Accepts a problem name and an instance of that problem, superceedAlert goes through the alert mechanism and deletes any alerts which would be superseded by an alert with the specified problem name and problem instance. |
| addAlert | This function is used to add an alert to SYSTEMWatch AI-L. |
| setAlertPriority | Accepts an alert and a priority, sets that specified alert to the specified priority. |
| checkAlerts | Checks the alert entity for all entries which need to be cleared or escalated. |
| clearAlertRefNum | Accepts an alert reference number. Performs reference number to alert number translation, and clears the alert. |
| addOwnerRefNum | Accepts an alert reference number and an owner. Performs reference number to alert number translation, and associates the specified owner to the alert number. |

8. filesys:

A program which contains database declarations, and rules used by SYSTEMWatch AI-L to monitor files and file systems on a computer.

The filesys program detects, for example, the following file system problems:

TABLE 15

| Problem | Description | Available Actions |
|---|---|---|
| FSFYI | File system has reached 90% full | fsrecom, rmjunk, rmoldjunk |
| FSWARN | File system has reached 95% full | fsrecom, rmjunk, rmoldjunk |
| FSALERT | File system has reached 98% full | fsrecom, rmjunk, rmoldjunk |

TABLE 15-continued

| Problem | Description | Available Actions |
|---|---|---|
| FSABSMIN | File system has less than 1 Mb free | fsrecom, rmjunk, rmoldjunk |
| FSINODEFYI | File system has less than 1000 inodes free | fsrecom, rmjunk, rmoldjunk |
| FSINODEWARN | File system has less than 200 inodes free | fsrecom, rmjunk, rmoldjunk |
| FSINODEALERT | File system has less than 20 inodes free | fsrecom, rmjunk, rmoldjunk |
| FSBEHAVE1 | Unusual short term behavior: File system utilization grows by 3% in 3 minutes, as compared to the average file system utilization for the most recent 30-minute period. | fsrecom, rmjunk, rmoldjunk |
| FSBEHAVE2 | Unusual long term behavior: File system utilization grows by 3% over 30 minutes, as compared to the average file system utilization for the most recent 24-hour period. | fsrecom, rmjunk, rmoldjunk |

Each of the threshold values underlined in the above table is a default value, which can be changed by the system administrator on either a computer specific basis or on a network wide basis via the configuration mechanism, as described above in the section on the config program.

The FSBEHAVE1 and FSBEHAVE2 problems can only be detected if the SYSTEMWatch AI-L client can establish a historical trend value for file system space utilization. The SYSTEMWatch AI-L client performs the historical trend line evaluation by using a recursive average filter. Note: This filter can be used in areas other than file system space monitoring. Although trend line analysis can also be performed using a moving average filter, a moving average filter is less desirable than a recursive average filter because the latter can accomodate more historical data, as well as function in an environment when the sample measurement time is irregular.

The recursive average filter calculates its first value by using a current value and computes subsequence instances by calculating a weighted average between the prior value and the new measurement. The weighting factor, which is called "ratio" below, may be set depending on the sensitivity to fluctuations in the current value. The higher the ratio is set, the more the computed value will fluctuate. In SYSTEMWatch AI-L, the ratio used is dependent upon the measurement window and the time difference between the prior calculation and the current calculation. The advantage of this ratio is that it provides a filter which gives a consistent response even if the measurement intervals vary substantially. This is important, since a real time measurement system cannot necessarily guarantee accuracy in the time between calculations.

One example of a recursive average filter technique is the following:

Xnow=the current value of the measurement, in this case, the file system space utilization.

XP=the historical value if it exists, otherwise, for the first calculation, it is equal to Xnow.

Xp=(Xp × (1−ratio))+(Xnow×ratio)

tdelta=current time−previous time XP was calculated ratio=1, if tdelta>time window, or tdelta/time window.

The above is an embodiment of how the FSBEHAVE1 and FSBEHAVE 2 rules determine the historical trend value. The FSBEHAVE1 and FSBEHAVE2 problems are detected based upon three inputs:

1. The historical trend value within a trend window;
2. The percentage difference of the current value from the trend value; and
3. The period of time over which the difference persists.

A problem occurs when the difference of the current value differs by the specified amount from the trend value for a period exceeding a specified period. In the FSBEHAVE1 and FSBEHAVE2 problems, we look only at increases beyond a trend line since as far as computer file systems are concerned, drops in space utilization are not considered problems.

The fileSysBehave1Compute and fileSysBehave2Compute rules function by calculating and storing a new trend value and the current time into the database. They also set a flag if the current value differs from the trend value by the specified amount. The trend values are stored in the database under the FILESYS_XP1 and FILESYS_XP2 entity/property combinations. The flags are stored in the database under the FILESYS_FL1 and FILESYS_FL2 entity/property combinations.

The fileSysBehave1Test and fileSysBehave2Test will call addAlert if the time the flag was set is larger than the specified time period.

The following actions are available to respond to problems detected by the filesys program:

TABLE 16

| Action | Description |
|---|---|
| fsrecom | Analyzes a specified file system by traversing the entire file system and gathering the following information: names of the 10 largest files, names of the 10 largest directories, the processes using each file, the percentage of the file system each file utilizes, names of all non-device files in the /dev directory, names of all junk files, log files, and error files on the file system. The files which comprises junk files, log files, and error files are defined in the configuration. The information gathered by the fsrecom action is stored into the database. |
| rmjunk | Queries database for a list of junk files producted by the fsrecom action (see above), and removes all the junk files retrieved from the database. |
| rmoldjunk | Virtually the same as rmjunk (above), but only removes those junk files whose modification time is at least 2 hours behind the clock time when the rmoldjunk action is initiated. |

The filesys program contains, for example, the following database declarations:

TABLE 17

| ENTITY | PROPERTY | TYPE | DESCRIPTION |
|---|---|---|---|
| FILESYS | MOUNTPOINT | string | Mount point or directory name that the file system is mounted onto |
| FILESYS | FSTYPE | string | File system type |
| FILESYS | MOUNTED | boolean | Is the file system mounted? |
| FILESYS | OPTIONS | string | Describes options that the file system may be mounted with. |
| FILESYS | SPACETOTAL | integer | Kilobytes of file system space total, including space reserved by root. |
| FILESYS | SPACEUSED | integer | Kilobytes of file system space used |
| FILESYS | SPACEAVAIL | integer | Kilobytes of file system space available to users. This number does NOT include any in reserve for root. |
| FILESYS | SPACEFREE | integer | Kilobytes of file system space free, including space reserved for root. |

TABLE 17-continued

| ENTITY | PROPERTY | TYPE | DESCRIPTION |
|---|---|---|---|
| FILESYS | SFACEPERC | float | Percentage space used, excluding the root reserve. |
| FILESYS | FILEUSED | integer | Number of inodes/files used. |
| FILESYS | FILESFREE | integer | Number of inodes/files used. |
| FILESYS | FILESTOTAL | integer | Total number of inodes/files. |
| FILESYS | FILESPERC | integer | Percentage of total inodes used. |
| FILESYS | XP1 | float | Historical trend value for the FSBEHAVE1 problem. |
| FILESYS | XP2 | float | Historical trend value calculated with a recursive average filter for the FSBEHAVE2 problem. |
| FILESYS | FL1 | integer | Variation flag used in the FSBEHAVE1 problem. |
| FILESYS | FL2 | integer | Variation flag used in the FSBEHAVE2 problem. |

No routines are declared in filesys.

These are the rules declared in one embodiment of filesys:

TABLE 18

| Rule Name | Initialization | Condition | Then-Action | Else-Action |
|---|---|---|---|---|
| fileSysUpdate | Sets state to DATA, gets rule interval from configuration. | (always true) | Gathers information on file systems | N/A |
| fileSysAbsMin | Sets state to EXCEPT, gets rule interval from configuration | If file system percentages have been updated since the last time this rule was checked and there are file systems in the database | Checks database for file systems which meet the FSABSMIN problem criteria. For each problem detected, post an alert to the alert Mechanism. | N/A |
| fileSysAlertFull | Set state to EXCEPT, set ONCE to false, gets rule interval from configuration | If file system percentages have been updated since the last time this rule was checked and there are file systems in the database | Checks database for file systems which meet the FSALERT problem criteria. For each problem detected, post an alert to the alert mechanism. | N/A |
| fileSysWarnFull | Set state to EXCEPT, get rule interval from configuration | If file system percentages have been updated since the last time this rule was checked, and there are file systems in the database | Checks database for file systems which meet the FSWARN problem criteria. For each problem detected, post an alert to the alert mechanism. | N/A |
| fileSysFYIFull | Set state to EXCEPT, get rule interval from configuration. | If file system percentages have been updated since the last time this rule was checked, and there are file systems in the database | Checks database for file systems which meet the FSFYI problem criteria. For each problem detected, post an alert to the alert mechanism. | N/A |
| fileInodeALERT | Set state to EXCEPT, get rule interval from configuration | If file system percentages have been updated since the last time this rule was checked, and there are file systems in the database | Checks database for file systems which meet the FSINODEALERT problem criteria. For each problem detected, post an alert to the alert mechanism. | N/A |
| fileInodeWarn | Set state to EXCEPT, get rule interval from configuration | If file system percentages have been updated since the last time this rule was checked, and there are file systems in the database | Checks database for file systems which meet the FSINODEWARN problem criteria. For each problem detected, post an alert to the alert mechanism. | N/A |
| fileInodeFYI | Set state to EXCEPT, get rule interval from configuration | If file system percentages have been updated since the last time this rule was checked, and there are file systems in the database | Checks database for file systems which meet the FSINODEFYI problem criteria. For each problem detected, post an alert to the alert mechanism. | N/A |
| fileSysBehave1Compute | Set state to DATA2, get rule interval from configuration | TRUE | Computes historical trend value using the recursive average filter and store the results in the database under a record of type | N/A |

TABLE 18-continued

| Rule Name | Initialization | Condition | Then-Action | Else-Action |
| --- | --- | --- | --- | --- |
| fileSysBehave1Test | Set state tp EXCEPT, get rule interval from configuration. | If the FL1 flag for a file system bas been set for a time period exceeding the applicable time period | FILESYS_XP1 Adds an FSBEHAVE1 alert. | N/A |
| filSysBehave2Compute | Set state to DATA2, get rule interval from configuration. | TRUE | Computes historical trend value using the recursive average filter and store the results in the database under a record of type FILESYS_XP2 | N/A |
| fileSysBehave2Test | Set state to EXCEP, get rule interval from configuration. | If the FL1 flag for a file system has been set for a time period exceeding the applicable time period | Adds an FSBEHAVE2 alert. | N/A |

9. files:
A program which simply contains the following database declarations, which are used in tracking files and file systems.

TABLE 19

| ENTITY | PROPERTY | TYPE | DESCRIPTION |
| --- | --- | --- | --- |
| FILES | DIRECTORY | string | Name of directory containing a file, or the directory name if the record describes a directory |
| FILES | FILENAME | string | Name of file or directory without its path |
| FILES | FILESYS | string | Name of file system containing file or directory |
| FILES | SIZE | integer | Size in bytes of a file or the sum of files in a directory |
| FILES | LINKS | integer | Number of links to a file or directory |
| FILES | FSPERC | float | Percent of file system size |
| FILES | MODE | string | File mode and permissions |
| FILES | FILETYPE | string | File types: FILE, DIR, LINK, OTHER |
| FILES | UID | integer | Owner's UID (user id number) |
| FILES | OWNER | string | Owner name |
| FILES | GID | integer | Owner's GID (group id number) |
| FILES | GROUP | string | Group name |
| FILES | ACCESSTIME | integer | file/directory access time |
| FILES | MODTIME | integer | File/Directory last modification time |
| FILES | PROCID | string | Process Ids that are accessing file as determined by the command fuser. |
| FILES | PROCUSER | string | Process user names that are accessing file as determined by the command fuser |
| FILES | PROCCOMMAND | string | Command name of first process on the list |
| FILES | DIRENTRIES | string | Number of directory entries in a directory. |
| FILES | DIRTREESIZE | integer | Sum of all file sizes in bytes in a directory tree. |
| FILES | TIMEOUT | integer | Time at which data should be erased |
| FILES | COMMENT | string | Free form list: used primarily by the file system recommendation action to store class of problem file. |
| FILECHANGE | DIRECTORY | string | Name of directory containing file, or the directory name if the record describes a directory |
| FILECHANGE | FILENAME | string | Name of file or directory without its path |
| FILECHANGE | FILESYS | string | Name of file system containing file or directory |
| FILECHANGE | SIZE | integer | Size of a file or the sum of files in a directory |
| FILECHANGE | FSPERC | float | Percentage of file system size |
| FILECHANGE | MODE | string | file mode and permissions |
| FILECHANGE | FILETYPE | string | File types: FILE, DIR, LINK, OTHER |
| FILECHANGE | UID | integer | Owner's UID (user id number) |
| FILECHANGE | OWNER | string | Owner's name |
| FILECHANGE | GID | integer | Owner's GID (group id number) |
| FILECHANGE | GROUP | string | Owner's group name |
| FILECHANGE | CREATETIME | integer | File/Directory create time |
| FILECHANGE | MODTIME | integer | File/Directory last modification time |
| FILECHANGE | PROCID | string | Process Ids that are accessing a file as determined by the command fuser |
| FILECHANGE | PROCUSER | string | Process Ids that are accessing a file as determined by the command fuser |

TABLE 19-continued

| ENTITY | PROPERTY | TYPE | DESCRIPTION |
|---|---|---|---|
| FILECHANGE | PROCCOMMAND | string | Command name of first process on the list |
| FILECHANGE | DIRENTRIES | integer | Directory entries/inodes |
| FILECHANGE | DIRSIZE | integer | Sum of all file sizes in a directory |
| FILECHANGE | DIRTREESIZE | integer | Sum of all file sizes in a directory tree |
| FILECHANGE | TIMEOUT | integer | Time at which data should be erased |
| FILECHANGE | COMMENT | string | Free form field: used primarily by file system recommendation action to store class of problem files |
| FILECHANGE | STARTSIZE | integer | File size at beginning of measurement |
| FILECHANGE | RATEINCREASE | integer | Rate of increase: (current size − start size)/timedelt/60. |

10. swap: A program which contains database declarations, a routine declaration, and rules used by SYSTEMWatch AI-L to monitor the virtual memory swap file for problems.

The swap program, for example, detects the following virtual memory problems:

TABLE 20

| Problem | Description | Available Actions |
|---|---|---|
| SWAPFYI | Swap space is up to 85% capacity. | addswap, tmpshutdown |
| SWAPWARN | Swap space is up to 90% capacity. | addswap, tmpshutdown |
| SWAPALERT | Swap space is up to 95% capacity. | addswap, tmpshutdown |
| SWAPABSMIN1 | Available swap space is less than 5 Mb. | addswap, tmpshutdown |
| SWAPABSMIN2 | Available swap space is less than 2 Mb. | addswap, tmpshutdown |

Each of the threshold values underlined in the above table is a default value, which can be changed by the system administrator on either a computer specific basis or on a network wide basis via the configuration mechanism, as described above in the section on the config program.

The following actions are available to respond to problems detected by the swap program:

TABLE 21

| Action | Description |
|---|---|
| addswap | Increases the amount of swap space available on the system by a two step process. First, addSwap creates a large file by using the UNIX command mkfile. Then, addSwap incorporates that file into the virtual memory system by using the UNIX command swapon, which lets the UNIX operating system to use the newly created file as swap space. addSwap attempts to create sufficient additional swap space so that at most 80% of the augumented swap space is used. |

TABLE 21-continued

| Action | Description |
|---|---|
| tmpshutdown | Shuts down the SYSTEMWatch AI–L client and console by causing the SYSTEMWatch AI–L client and the SYSTEMWatch AI–L console to exit their main loop. |
| cleanswap | Deletes the files added by the addswap action (above). |

The following database declarations are made in swap:

TABLE 22

| ENTITY | PROPERTY | TYPE | DESCRIPTION |
|---|---|---|---|
| SWAPSTAT | SWAPUSED | integer | Number of kb of swap space in use. E.g.: the USED value of the UNIX command pstat −s. |
| SWAPSTAT | SWAPAVIL | integer | Number of kb of swap space available. E.g.: the AVAILABLE value of the UNIX command pstat −s |
| SWAPSTAT | SWAPPERC | float | Percentage of available swap space m use. E.g.: USED/(USED AVAILABLE) from the UNIX command pstat −s. |
| SWAPSTAT | SWAPTOTAL | integer | Number of kb of swap space total. E.g.: the USED + AVAILABLE values from the UNIX command pstat −s. |

The routines declared in the swap program are the following:

TABLE 23

| NAME | FUNCTION |
|---|---|
| getSwap | Gathers swap space information by calling the readSwap function, and places the information returned, by the readSwap function into the database. |

These are the rules declared in filesys:

TABLE 24

| Rule Name | Initialization | Condition | Then-Action | Else-Action |
|---|---|---|---|---|
| swapUpdate | Sets state to DATA, gets interval from configuration | (always true) | Calls the getSwap routine | N/A |
| swapAbsMin2 | Sets state to EXCEF, gets interval from configuration, gets SWAPABSMIN2 limit from configuration | If available swap is less than the limit | Posts a SWAPABSMIN2 alert to the alert system. | N/A |

TABLE 24-continued

| Rule Name | Initialization | Condition | Then-Action | Else-Action |
| --- | --- | --- | --- | --- |
| swapAbsMin1 | Sets state to EXCEP, gets interval from configuration, gets SWAPABSMIN1 limit from configuration | If available swap is less than the limit | Posts a SWAPABSMIN1 alert to the alert system | N/A |
| swapAlert | Sets state to EXCEP, gets interval from configuration, gets SWAPALERT limit from configuration | If available swap is less than the limit | Posts a SWAPALERT alert to the alert system. | N/A |
| swapWarn | Sets state to EXCEP, gets interval from configuration, gets SWAPWARN limit from configuration | If available swap is less than the limit | Posts a SWAPWARN alert to the alert system. | N/A |
| swapFYI | Sets state to EXCEP, gets interval from configuration, gets SWAPFYI limit from configuration | If available swap is less than the limit | Posts a SWAPFYI alert to the alert system. | N/A |

11. process:
A program which contains database declarations, routines, and rules used by SYSTEMWatch AI-L to monitor processes on the computer.
The process program detects, for example, the following file system problems:

TABLE 25

| Problem | Description | Available Actions |
| --- | --- | --- |
| PROCCPU1 | A process is using 30% of the CPU time and the system load average has reached 2.5 | kill, stoptmp, stopload, nice5, nice10, nice15, nice20, schedule10, schedule25, schedule50, scheduleVIP10, scheduleVIP25, scheduleVIP50 |
| PROCCPU2 | A process is using 15% of the CPU time and the system load average has reached 5.0 | kill, stoptmp, stopload, nice5, nice10, nice15, nice20, schedule10, schedule25, schedule50, scheduleVIP10, scheduleVIP25, scheduleVIP50 |
| PROCCPU3 | A process is using 10% of the CPU time and the system load average has reached 7.5 | kill, stoptmp, stopload, nice5, nice10, nice15, nice20, schedule10, schedule25, schedule50, scheduleVIP10, scheduleVIP25, scheduleVIP50 |
| PROCMEM1 | A process is using 40% of the swap space and the virtual memory system is using 80% of the available swap space. | kill, stoptmp, stopload, nice5, nice10, nice15, nice20, schedule10, schedule25, schedule50, scheduleVIP10, scheduleVIP25, scheduleVIP50 |
| PROCMEM2 | A process is using 60% of the swap space and the virtual memory system is using 80% of the available swap space. | kill, stoptmp, stopload, nice5, nice10, nice15, nice20, schedule10, schedule25, schedule50, scheduleVIP10, scheduleVIP2S, scheduleVIP50 |
| PROCMEM3 | A process is using 80% of the swap space and the virtual memory system is using 80% of the available swap space. | kill, stoptmp, stopload, nice5, nice10, nice15, nice20, schedule10, schedule25, schedule50, scheduleVIP10, scheduleVIP25, scheduleVIP50 |

Each of the threshold values underlined in the above table is a default value, which can be changed by the system administrator on either a computer specific basis or on a network-wide basis via the configuration mechanism, as described above in the section on the config program.
The following actions are available to respond to problems detected by the filesys program:

TABLE 26

| Action | Description |
| --- | --- |
| kill | Kills the specified process by sending the process the UNIX kill signal. |
| stoptmp | Stops the specified process for a specified period of time by first sending the process a STOP signal, and sending the process a UNIX CONTINUE signal after the specified period of time has elapsed. |
| stopload | Stops the specified process until the 1 minute system load average drops beheath a specified |

TABLE 26-continued

| Action | Description |
| --- | --- |
| | load by first sending the process a UNIX STOP signal, and when the system load drops to the specified limit, by then sending the process a UNIX CONTINUE signal. |
| nice5 | Set the specified process' nice value to 5. |
| nice10 | Set the specified process' nice value to 10. |
| nicd15 | Set the specified process' nice value to 15. |
| nice20 | Set the specified process' nice value to 20. |
| schedule10 | Reschedules a process so that it run approximately 10% of the time. Schedule10 queries the database periodically to ascertain what percentage of the CPU the specified process is consuming. If the process uses more than the goal percent CPU consumption, it is reniced such that it uses less CPU resources. If the process uses less than the goal percent CFU consumption, it is reniced so that it uses more CPU resources. This action only uses non-priviledged calls to renice. |
| schedule25 | Similar to schedule10, except the percent CPU goal is 25% instead of 10%. |
| schedule50 | Similar to schedule10, except the percent CFU goal is 50% instead of 10%. |
| scheduleVIP10 | Similar to schedule10, except this action can utilize priviledged calls to renice as well as the normal non-priviledged calls to renice. Privledged nice calls are those nice values which cause the UNIX operating system to give a process more CPU time than normally allowed. These calls are priviledged because only a process running with an effective user id of root (the UNIX "superuser") may assign such a nice value to a process. |
| scheduleVIP25 | Similar to schedule25, except this action can utilize priviledged calls to renice as well as the normal non-priviledged calls to renice. |
| scheduleVIP50 | Similar to schedule50, except this action can utilize priviledged calls to renice as well as the normal non-priviledged calls to renice. |

The process program contains the following database declarations:

TABLE 27

| ENTITY | PROPERTY | TYPE | DESCRIPTION |
| --- | --- | --- | --- |
| PROCESS | UID | integer | User-ID of the owner of a process |
| PROCESS | OWNER | string | Account name of the owner of a processes |
| PROCESS | MEMORY | string | Sum of data memory size and stack memory size in kb, which is all the memory usage affecting the swap space usage. (This does not include the executable program memory (text space)) See also UNIX manual page on the command ps(1). |
| PROCESS | RSS | integer | Resident Set Size: The total amount of physical memory that is being used by the process at the time, including DATA, STACK, and TEXT. It does NOT include memory swapped to disk. This number changes widely and is under the control of the virtual memory manager. See also UNIX manual page on the command ps(1). |
| PROCESS | NICE | integer | Process NICE priority value |
| PROCESS | CPUPERC | float | Percentage of CPU used. Total CPU used/Clock Time since last measurement interval. |
| PROCESS | LIFECPUPERC | float | Percentage of CPU Used over the life time of the Total CPU used/(Clock Start Time now) |
| PROCESS | BLOCKSIN | integer | Number of block input operations |
| PROCESS | BLOCKSOUT | integer | Number of block output operations. |
| PROCESS | MAJORFAULTS | integer | Number of major page faults. Major page faults are those that actually require an I/O operation |
| PROCESS | SYSTIME | float | Number of seconds of CPU Time used for executing system calls on behalf of this process. |
| PROCESS | USERTIME | float | Number of seconds of CPU Time used for executing actual user level code of a program (i.e., the program itself) |
| PROCESS | TOTTIME | float | Number of seconds of total CPU time used for this process (system time and user time) |
| PROCESS | STARTTIME | integer | Start time of process |
| PROCESS | COMMAND | string | Name of program or command executed |
| PROCESS | COMMANDLINE | string | Complete command line for process |
| PROCCPU | PROCCPU | float | Temporary structure used for computing CPU % used |
| PROCMGT | MGTTYPE | string | Type of management action, contains one of: NICE, STOPTMP, STOPLOAD, SCHEDULE. |
| PROCMGT | RESETTIME | integer | Time to reset process to prior state. Used with NICE and STOPTMP. |
| PROCMGT | SYSLOAD | float | System 1 minute load average goal. When actual load average goes below this value, the process will receive a CONTINUE signal. This is used only with the STOPLOAD action. |

TABLE 27-continued

| ENTITY | PROPERTY | TYPE | DESCRIPTION |
| --- | --- | --- | --- |
| PROCMGT | CPUPERC | float | CPU % goal to keep process. Used with the SCHEDULE actions. |
| PROCMGT | OLDNICE | integer | Original nice value of this process, prior to any management actions taking place. This is used by the NICE actions and the SCHEDULE actions. |
| PROCMGT | MINNICE | integer | Minimum allowable nice value allowed for this process. Used by the SCHEDULE actions. |
| PROCMGT | MAXNICE | integer | Maximum allowable nice value allowed for this process. Used by SCHEDULE actions. |
| PROCMGT | NICEINCR | integer | Increment of nice value adjustment for this process. Used by the SCHEDULE actions. |
| SYSLOAD | LOAD1 | float | System load average over last 1 minute |
| SYSLOAD | LOAD5 | float | System load average over last 5 minutes |
| SYSLOAD | LOAD15 | float | System load average over last 15 minutes |

The routines declared in the process program are, for example, the following

TABLE 28

| NAME | FUNCTION |
| --- | --- |
| privNice | Accepts a process id and a nice value, makes a privileged system call to the UNIX nice function, and reschedules the specified process with the specified nice value. |
| privKill | Accepts a process id and a signal name, makes a privileged system call to the UNIX kill function, and sends the specified process the specified signal. |
| schedNice | Accepts a process id, a nice value, and a time period. Checks process table to see if the process still exists. If so, obtain its current nice value. Then, reschedule that process with the specified nice value. Finally store information into the PROCMGT entity for the specified process using the following properties:<br>MGTTYPE should be "NICE"<br>RESETTIME should be the current time plus the specified time period.<br>OLDNICE should be the specified process's nice value before we called the nice function. |
| schedSTOPTMP | Accepts a process id and a time period. If the specified process exists and if it is also not currently being managed, send a stop signal to the specified process, and store information into the PROCMGT entity for the specified process using the following properties:<br>MGTTYPE should be "STOPTMP"<br>RESETTIME should be current time plus the specified time period |
| schedSTOPLOAD | Accepts a process id and a target load number. Tests to see if specified process exists. If so, and if the process is not already being managed, check to see if current 1 minute load average is above the target. If so, send a stop signal to the specified process and store information into the PROCMGT entity for the specified process using the following properties:<br>MGTTYPE should be "STOPLOAD"<br>SYSLOAD should be the specified load |
| unscheduleProc | Accepts a process id. Checks to see if process still exist, and checks to see if process is being managed. If so, then restore old nice if the process was niced, or resume a stopped process if the process was stopped. |
| schedCheckProc | Accepts a list of processes which have been managed by one of the scheduling actions designed to keep a process consuming a certain percentage of CPU time. Checks each process' actual CPU percentage usage against each process's goal, and reschedule the process if necessary. (See also schedProcess) |
| schedProcess | Accepts a process id, a cpu percentage use goal, a nice increment, a maximum nice value, and a minimum nice value. For the specified process, manage the process until either it terminates or the unMangeProc function is called. The management action is to keep the specified process's CPU usage within a certain window. The window ranges from a low of 80% of the specified percentage goal to a high equal to the specified percentage goal. If the process' CPU usage is not within the window, renice the process by a factor equal to the nice increment, but in no case let the nice factor exceed the maximum or drop below the minimum values specified. |
| getProcessInfo | Walks through the kernel process table to get process information about each process on the system, and stores the same into the SYSTEMWatch AI–L database. |
| getSysLoad | Gets the system load average over the last minute, 5 minutes, and 15 minutes and store the same in the SYSTEMWatch M–L database. |
| computeCPUPerc1 | Goes through each data record with entity PROCPU and property PROCPU and calculate the percentage CPU usage of each element, and stores the computed percentage into a corresponding entry of entity PROCESS and property PROCCPU. |

TABLE 28-continued

| NAME | FUNCTION |
| --- | --- |
| computeCPUPerc2 | Goes through the database and removes all records with entity PROCCPU and property PROCCFU. Goes through the database to get all the records of entity PROCESS property TOTIME, and create a corresponding record of entity PROCCPU and property PROCPU with the same value. |

These are the rules declared in process:

TABLE 29

| Rule Name | Initialization | Condition | Then-Action | Else-Action |
| --- | --- | --- | --- | --- |
| processUpdate2 | Set state to DATA, get load from configuration. | If the system load is above the load, or if there are processes being scheduled in a % CFU window | Calls getProcessInfo (see Table 28), computeCPUPerc1, and computeCPUPerc2. | N/A |
| schedStopLoad | Set state to DATA2, interval to 30 seconds. | If the entity SYSLOAD has been updated since the last time this rule was checked, and there are processes scheduled under a STOPLOAD action, and if the system load average is below the STOPLOAD threshold | Unschedule each process which qualifies under the condition. | N/A |
| schedStopTmp | Set state to DATA2, interval to 30 seconds | If there exist any processes which were scheduled under a STOPTMP action whose sleep time has elsped | For each such process, unschedule. | N/A |
| schedule | Set state to DATA2, interval to 30 seconds | If the process entity has been updated since the last time this rule was checked, and if there are processes being managed under a scheduling action | For each such process, call schedCheckProc | N/A |
| procCPU1 | Set state to EXCEP, interval from configuration, get threshold load and threshold percentage from configuration. | If the process entity has been updated since the last time this rule was checked, and if the 1-minute system load average is above the threshold load | Go through the process information and add a PROCCPU1 alert to all processes which have a CPU consumption percentage above the threshold percentage | N/A |
| procCPU2 | Set state to EXCEP, interval from configuration, get threshold load and threshold percentage from configuration. | If the process entity has been updated since the last time this rule was checked, and if the 1-minute system load average is above the threshold load | Go through the process information and add a PROCCPU2 alert to all processes which have a CFU consumption percentage above the threshold percentage | N/A |
| procCPU3 | Set state to EXCEP, interval from configuration, get threshold load and threshold percentage from configuration. | If the process entity has been updated since the last time this rule was checked, and if the 1-minute system load average is above the threshold load | Go through the process information and add a PROCCPU3 alert to all processes which have a CFU consumption percentage above the threshold percentage | N/A |
| procMEM1 | Set state to EXCEP, get interval from configuration, get usage threshold and total usage threshold from configuration. | If the process entity has been updated since the last time this rule was checked, and if the system swap space utilization is above the total usage threshold, and if there are processes whose swap consumption is above the usage threshold | For each such process, add a PROCMEM1 alert. | N/A |
| procMEM2 | Set state to EXCEP, get interval from configuration, get usage threshold and total usage threshold from configuration. | If the process entity has been updated since the last time this rule was checked, and if the system swap space utilization is above the total usage threshold, and if there are processes whose swap consumption is above the usage threshold | For each such process, add a PROCMEM2 alert. | N/A |

TABLE 29-continued

| Rule Name | Initialization | Condition | Then-Action | Else-Action |
|---|---|---|---|---|
| procMEM3 | Set state to EXCEP, get interval from configuration, get usage threshold and total usage threshold from configuration. | If the process entity has been updated since the last time this rule was checked, and if the system swap space utilization is above the total usage threshold, and if there are processes whose swap consumption is above the usage threshold | For each such process, add a PROCMEM3 alert. | N/A |

12. daemon:

A program which contains database declarations, routines, and rules used by SYSTEMWatch AI-L to monitor system and application daemons.

SYSTEMWatch AI-L can track up to 5 separate daemons per monitored computer by monitoring the daemons periodically. If a monitored daemon dies, SYSTEMWatch AI-L will notify the system administrator that a monitored daemon died. Under normal circumstances SYSTEMWatch AI-L will then automatically attempt to restart the daemon, and post an alert to notify the system administrator whether the restart attempt was sucessful.

However, SYSTEMWatch AI-L will not attempt to restart a deamon if starting from the current time and going back a period of time (known as the restart period) SYSTEMWatch AI-L has already attempted to restart the daemon a certain number of times. Under this circumstance, it is assumed that something is preventing the daemon from operating correctly, and SYSTEMWatch AI-L posts an alert notifying the system administrator that the daemon in blocked. After the system administrator intervenes to resolve the problem, the system administrator can issue an unblock action to reset the daemon application.

The daemon program detects, for example, the following daemon problems:

TABLE 30

| Problem | Description | Available Actions |
|---|---|---|
| RESTART | SYSTEMWatch AI–L just checked this monitored daemon. In the last 120 seconds, the daemon has died. However, in the last 900 seconds, SYSTEMWatch AI–L has NOT attempted to restart this daemon 5 times. SYSTEMWatch AI–L will now attempt to restart the daemon, and will post an alert to the system administrator notifying him of the restart attempt, and whether the restart attempt was successful. | None |
| RESTARTBLOCK | SYSTEMWatch AI–L just checked this monitored daemon. In the last 120 seconds, the daemon has died. Moreover, in the last 900 seconds, SYSTEMWatch AI–L has attempted to restart this daemon 5 times. SYSTEMWatch AI–L will no longer automatically attempt to restart the daemon, and will notify the system administrator via an alert of this problem. | Unblock |
| RESTARTDISABLED | The configuration information supplied to SYSTEMWatch A–L specifies a daemon which doesn't exist. Consequently, SYSTEMWatch AI–L will not monitor this daemon. | None |

Each of the threshold values underlined in the above table is a default value, which can be changed by the system administrator on either an computer specific basis or on a network wide basis via the configuration mechanism, as described above in the section on the config program.

The following actions are available to respond to problems detected by the daemon program

TABLE 31

| Action | Description |
|---|---|
| Unblock | Clears the RESTARTBLOCK alert, and resets the number of restart attempts to zero. This action is meant to be performed after the system administrator has manually corrected the problem which resulted in the RESTARTBLOCK alert. |

The daemon program contains, for instance, the following database declarations:

TABLE 32

| ENTITY | PROPERTY | TYPE | DESCRIPTION |
|---|---|---|---|
| DAEMON | SEARCHSTRING | string | Regular expression search string to check for this daemon. This field is maintained solely for reporting purposes. |
| DAEMON | LASTSTART | string | Time of last restart attempt. This field is maintained solely for reporting purposes. |
| DAEMON | BLOCKED | integer | Field to track if the daemon is blocked from restarts. |
| DAEMON | COUNT | integer | The number of times a daemon was attempted to restart since the beginning of the restart period. The update time for this field contains the value of the start time of this restart period |
| DAEMON | RESTARTPERIOD | integer | This is the beginning time of the restart period. This field is actually a duplicate copy of the corresponding DAEMON_COUNT's update time field, and is solely used for ease of reporting. |
| DAEMON | COMMANDLINE | string | Complete command line to restart process. This field is maintained solely for reporting purposes. |

The routines declared in the daemon program are the following:

TABLE 33

| NAME | FUNCTION |
|---|---|
| restartDaemon | restartDaemon will attempt to restart a daemon which is not currently running. restartDaemon first searches the database to determine how many times SYSTEMWatch AI–L has restarted the specified daemon. If this exceeds the threshold specified in the configuration, then restartDaemon will post an alert stating that the daemon is blocked. Otherwise, restartDaemon will try to restart the daemon, increase the restart count for the daemon, and check to see if the daemon restarted. If so, it will post an alert stating that the daemon was sucessfully restarted. Otherwise, it will post an alert stating that the restart attempt failed. |

These are the rules declared in daemon:

TABLE 34

| Rule Name | Initialization | Condition | Then-Action | Else-Action |
|---|---|---|---|---|
| processUpdate | set state to DATA, get interval from configuration | If the last time the process entity has been updated is older than the rule interval | call the getProcess Info function | N/A |
| ruleDaemon1 | set state to EXCEP, get daemon search string, command line, restart period, maximum restarts in a restart period, and rule interval from configuration | If the process entity has been updated since the last time this rule was checked, and there is a daemon which this rule is monitoring, and the specified daemon cannot be found in the database's list of processes and the specified daemon is not 'blocked' | Attempt to restart the daemon. | N/A |
| ruleDaemon2 | set state to EXCEP, get daemon search string, command line, restart period, maximum restarts in a restart period, and rule interval from configuration | If the process entity has been updated since the last time this rule was checked, and there is a daemon which this rule is monitoring, and the specified daemon cannot be found in the database's list of processes and the specified daemon is not 'blocked' | Attempt to restart the daemon. | N/A |
| ruleDaemon3 | set state to EXCEP, get daemon search string, command line, restart period, maximum restarts in a restart period, and rule interval from configuration | If the process entity has been updated since the last time this rule was checked, and there is a daemon which this rule is monitoring, and the specified daemon cannot be found in the database's list of processes and the specified daemon is not 'blocked' | Attempt to restart the daemon. | NIA |
| ruleDaemon4 | set state to EXCEP, get daemon search string, command line, restart period, maximum restarts | If the process entity has been updated since the last time this rule was checked, and there is a daemon which this rule is monitoring, and the specified daemon cannot be found in the | Attempt to restart the daemon. | N/A |

TABLE 34-continued

| Rule Name | Initialization | Condition | Then-Action | Else-Action |
|---|---|---|---|---|
| ruleDaemon5 | in a restart period, and rule interval from configuration set state to EXCEP, get daemon search string, command line, restart period, maximum restarts in a restart period, and rule interval from configuration | database's list of processes and the specified daemon is not 'blocked' If the process entity has been updated since the last time this rule was checked, and there is a daemon which this rule is monitoring, and the specified daemon cannot be found in the database's list of processes and the specified daemon is not 'blocked' | Attempt to restart the daemon. | N/A |

13. actions:

When a problem is detected by SYSTEMWatch AI-L, the SYSTEMWatch AI-L client can be configured to automatically respond to the detected problem by initiating an automated action.

However, if the SYSTEMWatch AI-L client is not configured to automatically respond to a problem, the system administrator can use the SYSTEMWatch AI-L console to command a particular SYSTEMWatch AI-L client to perform an action in response to a detected problem. The routines found in the actions program are the routines which are executed when the SYSTEMWatch AI-L client receives a command from the SYSTEMWatch AI-L console to initiate an action. These functions are generally front end functions which then call the appropriate (and related) routine described earlier. The actions program only contains these routines; it does not make any database nor expert system declarations.

The routines declared in the actions program are, for instance, the following:

TABLE 35

| NAME | FUNCTION |
|---|---|
| execUnBlock | This function performs the unblock action as specified in the section on the daemon program. |
| execDie | This function terminates program execution. This function is called whenever the SYSTEMWatch AI–L client receives a "die" message from a SYSTEMWatch AI–L console. |
| execReset | This function restarts program execution. This function is called whenever the SYSTEMWatch AI–L client receives a "restart" message from a SYSTEMWatch AI–L console. |
| execSchedule | This function is a front end for the schedule10, schedule25, schedule50, scheduleVIP10, scheduleVIP25, and scheduleVIP50 actions as specified on the section on the process program. |
| execNice | This function is a front end for the nice5, nice10, nice15, and nice20 actions as specified on the section on the process program. |
| execStopLoad | This function is a front end for the stopload action as specified by the section on the process program. |
| execStopTmp | This function is a front end for the stoptmp action as specified by the section on the process program. |
| execUnschedule | This function is the front end for the unschedule action as specified by the section on the process program. |
| execKill | This function is the front end for the kill action as specified by the section on the process program. |
| execAILTmpShutDown | This function is the front end for the tmpshutdown action as specified by the section on the swap program. |
| execCleanSwap | This function is the front end for the cleanswap action as specified in the swap program. |
| execAddSwap | This function is the front end for the addswap action as specified in the swap program. |
| execFSrmjunk | This function is the front end for the rmjunk action as specified in the filesys program |
| execFSrecom | This function is the front end for the fsrecom action as specified in the filesys program |
| doAction | Sends a message to a specified host and module, requesting that it perform a specified action with specified parameters |
| doDefaultAction | Given an alert, perform the default action(s) for the alert if the default actions have not yet been performed. |
| actAlertRefNum | Given an alert reference number and an action, translate the reference number to an alert-id number/host combination, and send a request to the SYSTEMWatch AI–L client on the appropriate host to perform the specified action against the specified alert. |
| execWall | Given a message string, executes the unix 'wall' command with the supplied string. |

The actions program contains no rule declarations.

14. ruleinit:

A program which contains the rules responsible for moving the expert system rule state from one state to another. The SYSTEMWatch AI-L expert system has two types of rule states. First, the expert system has an expert system rule state. Second, each rule has a rule state. The expert system will only test rules which have the same rule state as the current expert system rule state. When execRules is called, the expert system begins execution with the expert system rule state set to no state. The only rule in the expert system with such a state is the firstRule rule described below, so that rule is ensured to be the first rule actually evaluated by the expert system even though it has a specificity of zero.

Rule init contains no database declarations, nor routines. These are the rules declared in ruleinit:

TABLE 36

| Rule Name | Initialization | Condition | Then-Action | Else-Action |
| --- | --- | --- | --- | --- |
| firstRule | (none) | (always true) | Sets the expert system rule state to DATA. This rule is the only rule in the expert system without its own state. | N/A |
| gotoDATA2 | Rule state to DATA. | (always true) | Sets the expert system rule state to DATA2. | N/A |
| gotoEXCEP | Rule state to DATA2. | (always true) | Sets the expert system rule state to EXCEP | N/A |
| lastRule | Rule state to EXCEP | (always true) | Sets the expert system rule state to DONE. No rules have a rule state of DONE, so execRules returns after evaluating this rule. | N/A |

After the SYSTEMWatch AI-L client has read the 14 program files above, it reads the file containing the configuration information. In one embodiment, the file containing the configuration file is stored within the directory tree where SYSTEMWatch AI-L was installed. The information contained in that file is incorporated into the core layer's database, so that the rules can look up threshold values in the database.

Then, the SYSTEMWatch AI-L client reads the alerts and ignore actions which were stored on disk by a previous instance of the SYSTEMWatch AI-L client, and incorporates those alerts and ignore actions into the core layer's database.

Figure 9:
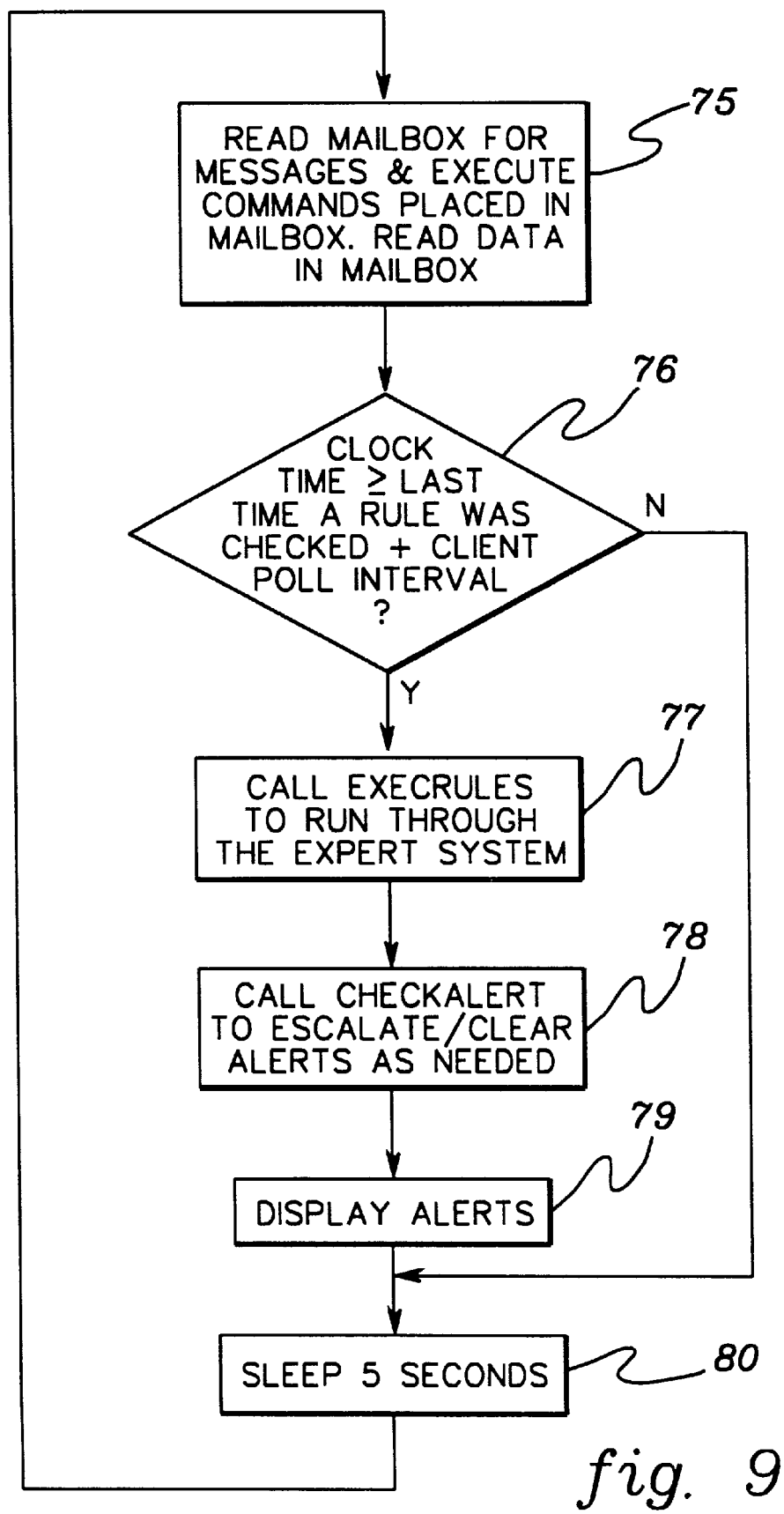
FIG. 9 illustrates one embodiment of the SYSTEMWatch AI-L client's "client loop"

Then, the SYSTEMWatch AI-L client enters the client loop. Inside the client loop, the SYSTEMWatch AI-L client does the following (See FIG. 9):

A. The SYSTEMWatch AI-L client reads the data and commands sent to it from any SYSTEMWatch AI-L consoles. As the SYSTEMWatch AI-L client reads command(s), it executes them, STEP 75. Note: One of the possible commands the dient might receive is a command from the SYSTEMWatch AI-L console to terminate. If the client receives a terminate command, it first saves the current alerts and the ignore actions in effect, and then exits.

B. The SYSTEMWatch AI-L client checks the current clock time and against the time the last rule was checked by the expert system, INQUIRY 76. If the current clock time is greater or equal to the last time a rule was checked by the expert system plus the client poll interval, the SYSTEMWatch AI-L client sets the expert system rule state to an empty string and calls the execRules function, STEP 77. The client poll interval is a data found in the configuration.

The execRules function causes the expert system to run through its rules. Because of the way the rules are written in the 13 program files, the expert system will transition from the empty string state to the DATA state, where all the data collection rules will be checked, to the DATA2 state, where any post data gathering pre-processing rules will be checked, and finally to the EXCEP state, where any problem detection/resolution rules will be checked.

C. The SYSTEMWatch AI-L client calls the checkAlert function to escalate and clear alerts as necessary, STEP 78.

D. The SYSTEMWatch AI-L client then displays a list of current alerts, STEP 79.

E. The SYSTEMWatch AI-L client then sleeps for 5 seconds, STEP 80.

F. The SYSTEMWatch AI-L client then skips to step A of the client loop, STEP 75.

An Overview of the SYSTEMWatch AI-L Console

The task of SYSTEMWatch AI-L console, 21, is to receive notification messages from the SYSTEMWatch AI-L client(s) and communicate commands to any group of clients. Thus, the SYSTEMWatch AI-L console is a vehicle that a system administrator uses to monitor the status of the managed computers.

Figure 5:
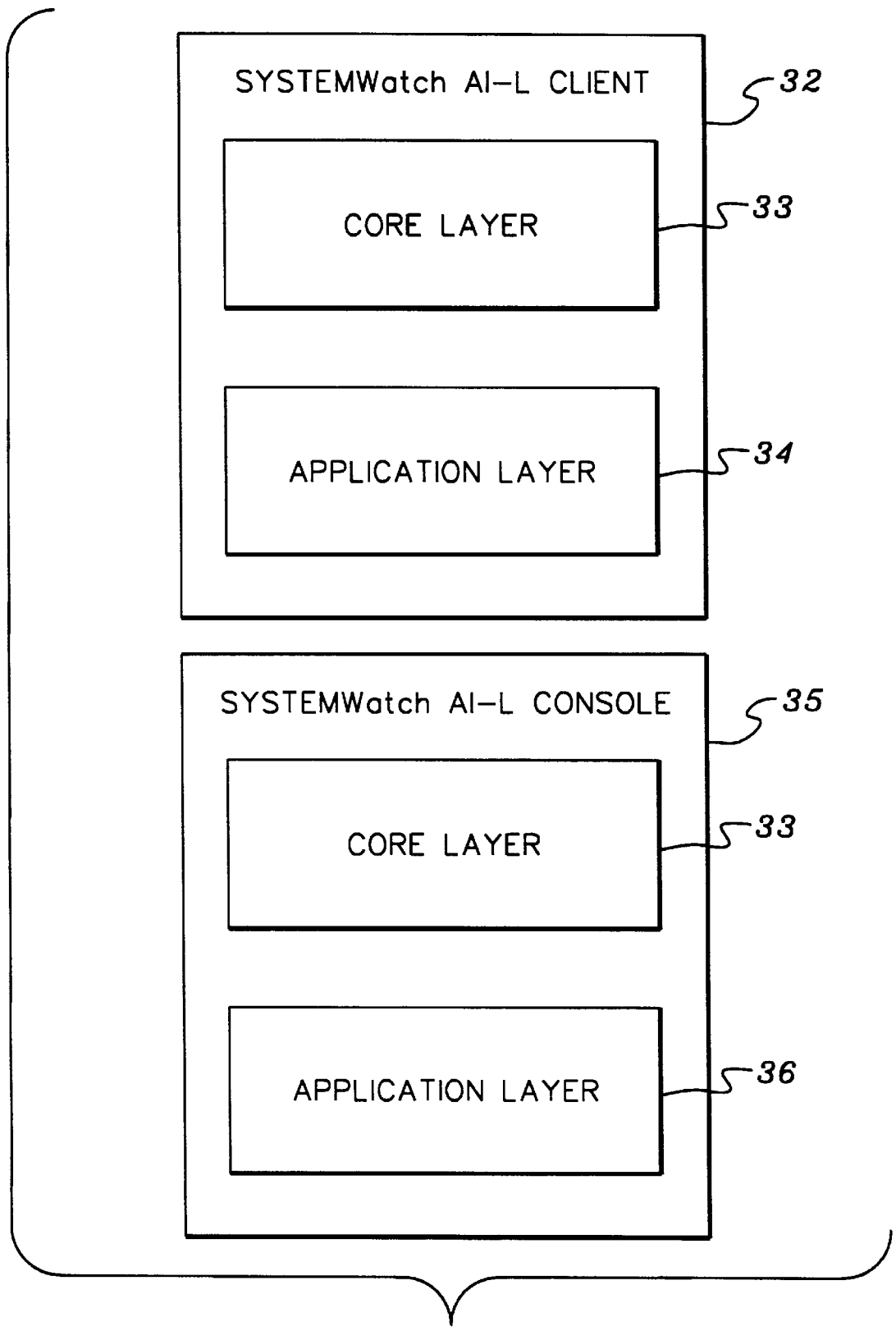
FIG. 5 illustrates one embodiment of the SYSTEMWatch AI-L client and the SYSTEMWatch AI-L console, comprising of a core layer plus an application layer.

One embodiment of the structure of the SYSTEMWatch AI-L console is virtually identical to that of the SYSTEMWatch AI-L client. See FIG. 5. This is because the SYSTEMWatch AI-L console is also bifurcated into the same two layers as the SYSTEMWatch AI-L. Thus when the SYSTEMWatch AI-L console begins, it consists of the core layer reading a file containing a program written in the high level language which can be interpreted by the core. At this point, the database in the core layer has no data record definitions, and no data records. Similarly, the expert system within the core layer has no rules, variables, or routines. As the language interpreter portion of the core begins to interpret and execute the program, the first thing the program causes the core to do is to perform some housekeeping work. This work consists of ensuring that the communications mailboxes used by the client are set up. After the housekeeping is done, the program causes the core to read in a series of files. These files are also files with programs written in the high level language. As each file is read, the routines, data record definitions, and rules expressed in each file are incorporated into the database, expert system, and language interpreter of the core. The files read by the SYSTEMWatch AI-L console are the same files read by the SYSTEMWatch AI-L client. Thus, the SYSTEMWatch AI-L console reads, for instance, the following files in the following order.

1. worksets
2. configs
3. events
4. requests
5. coms
6. lib
7. alerts
8. filesys
9. files
10. swap
11. process
12. daemon
13. actions
14. ruleinit Since these files are identical to the files read by the SYSTEMWatch AI-L client, there is no need to describe them again. For details, refer to the corresponding section on the description of the SYSTEMWatch AI-L client.

After the SYSTEMWatch AI-L console has read the 14 program files above, it reads the file containing the configuration information. The information contained in that file is incorporated into the core layer's database, so that the rules can look up threshold values in the database.

Figure 10:
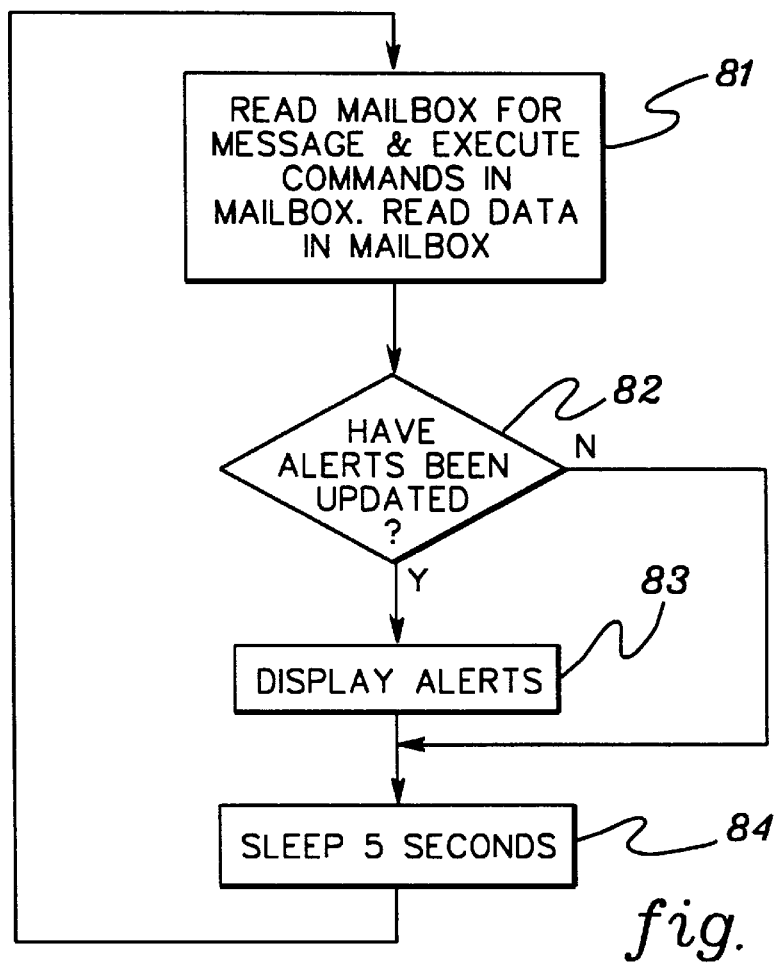
FIG. 10 illustrates one embodiment of the SYSTEMWatch AI-L console's "console loop"

Then, the SYSTEMWatch AI-L console enters the console loop. Inside the console loop, the SYSTEMWatch AI-L console does the following (See FIG. 10):

A. The SYSTEMWatch AI-L console reads the data and command sent to. As the SYSTEMWatch AI-L console reads command(s), it executes them, STEP 81. Note: The commands and data send to the SYSTEMWatch AI-L console from a SYSTEMWatch AI-L client is composed of alert notifications from the SYSTEMWatch AI-L client, and certain data the SYSTEMWatch AI-L client sends to the console in response to a data request command issued by the system administrator to the SYSTEMWatch AI-L client through the console.

B. The SYSTEMWatch AI-L console then checks to see if its database of alerts has been updated, INQUIRY 82. If so, the console displays all active alerts, STEP 83.

C. The SYSTEMWatch AI-L console then sleeps for, for instance, 5 seconds, STEP 84, and jumps to step A, STEP 81.

Note:

One consequence of having SYSTEMWatch AI-L console, 21, use the same core layer, 33, as SYSTEMWatch AI-L client, 13, is that SYSTEMWatch AI-L console, 21, has the ability to perform the same data gathering, storing, analysis, and action as SYSTEMWatch AI-L client, 13. This means that SYSTEMWatch AI-L console, 21, can perform a network level analysis (i.e., analysis of data and conditions of several computers on a network, as opposed to SYSTEMWatch AI-L client, 13, which analyzes data on a managed computer, 2) based upon data it can gather and problem alerts it recevies from SYSTEMWatch AI-L clients, 13.

Figure 11:
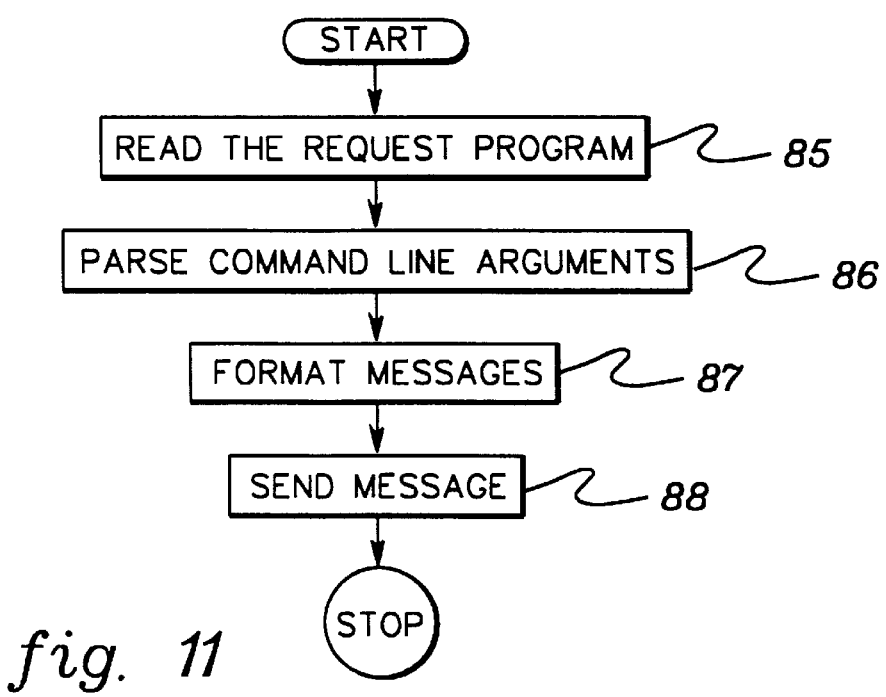
FIG. 11 illustrates one embodiment of the SYSTEMWatch AI-L request facility.

In addition to the facilities described above, the SYSTEMWatch AI-L also provides two auxulliary components which is used with the SYSTEMWatch AI-L console. These two components are the SYSTEMWatch AI-L send facility (FIG. 11) and the SYSTEMWatch AI-L report facililty (FIG. 12), which are described below:

Overview of the SYSTEMWatch AI-L Send Facility

The SYSTEMWatch AI-L send facility is used by the system administrator to send a command to the SYSTEMWatch AI-L console located on the same machine as the send facility. The command sent is read by the SYSTEMWatch AI-L console, and if the command was intended for a SYSTEMWatch AI-L client, or a group of SYSTEMWatch AI-L clients, the SYSTEMWatch AI-L console will relay the message to the appropriate SYSTEMWatch AI-L client(s).

The system administrator may use the SYSTEMWatch AI-L send facility to perform a five types of functions:

1. To dear alert(s)

| | |
|---|---|
| syntax: | send clear <alert reference number(s)> |
| example: | send clear 2 3 |
| | will clear alerts 2 and 3. |

2. To ignore alert(s)

| | |
|---|---|
| syntax: | send ignore <alert reference number(s)> |
| example: | send ignore 4 |
| | will cause alert 4 to be ignored |

3. To add an owner to an alert

| | |
|---|---|
| syntax: | send owner <alert reference number> |
| example: | send owner lars 5 |
| | will cause tell SYSTEMWatch AI-L that the user lars now owns the problem represented by the alert with an reference number of 5. |

4. To tell a SYSTEMWatch AI-L client on a specific host to initiate a specific action:

| | |
|---|---|
| syntax: | send do <hostname> <action> <optional parameters> |
| example: | send do server1 fsrecom /usr |
| | will cause the SYSTEMWatch AI-L client on the machine server1 to perform the fsrecom action on the /usr file system. |

5. To tell a SYSTEMWatch AI-L client to initiate a specific action, specifying the SYSTEMWatch AI-L client and optional parameters implicitly by referencing an alert reference number:

| | |
|---|---|
| syntax: | send act <action name> <alert reference number> |
| example: | send act fsrecom2 |
| | will cause the SYSTEMWatch AI-L client which posted the alert which the local console has assigned reference number 2 to initiate a fsrecom action on the file system which developed the problem that cause that SYSTEMWatch AI-L client to post the alert. |

The SYSTEMWatch AI-L send facility is implemented as a Unix shell script which starts up the same core layer which the SYSTEMWatch AI-L client and console use. However, the shell script causes the SYSTEMWatch AI-L send facility to use a different application layer, and passes the command line arguments the shell script received to the core program.

The application layer of the SYSTEMWatch AI-L send facililty then reads the same request program which the SYSTEMWatch AI-L client and SYSTEMWatch AI-L console uses, STEP 85. This provides the SYSTEMWatch AI-L send facility with the necessary mechanisms to format messages and send them to the SYSTEMWatch AI-L console. Then, the SYSTEMWatch AI-L send facility simply parses the command line arguments the shell script received, STEP 86, formats a message, STEP 87, and calls the request function to communicate the command to SYSTEMWatch AI-L, STEP 88.

Overview of the SYSTEM Watch AI-L Report Facility

The SYSTEMWatch AI-L report facility is used by the system administrator to receive various reports from the SYSTEMWatch AI-L console located on the same machine as the report facility. While the SYSTEMWatch AI-L console always displays a list of the current problem alerts, the report facility provides the system administrator more flexibility in discovering what is happening with the group of managed computers. The SYSTEMWatch AI-L report facility accomplishes this by being a process dedicated to getting and displaying information from the local console (and through the local console, to the various clients).

The system administrator may use the SYSTEMWatch AI-L report facility to perform five types of functions:

1. To display all problem alerts from all SYSTEMWatch AI-L clients (just like the console alerts display)

| syntax: | report |
|---|---|
| example: | report |
| | will show a report display similar to the console alert display. |

2. To display information pursuant to the parameters specified in a report file.

| syntax: | report <report file> |
|---|---|
| example: | report files |
| | will show a report display according to the criteria specified in the report file named files. Report files can specify which property/entity combinations to query data on, and filter that information by host. |

Like the SYSTEMWatch AI-L send facility, the SYSTEMWatch AI-L report facility is implemented as a UNIX shell script which starts the same core layer as the SYSTEMWatch AI-L client and the SYSTEMWatch AI-L console. The application layer which the SYSTEMWatch AI-L reporting facility uses, however is different.

Figure 12:
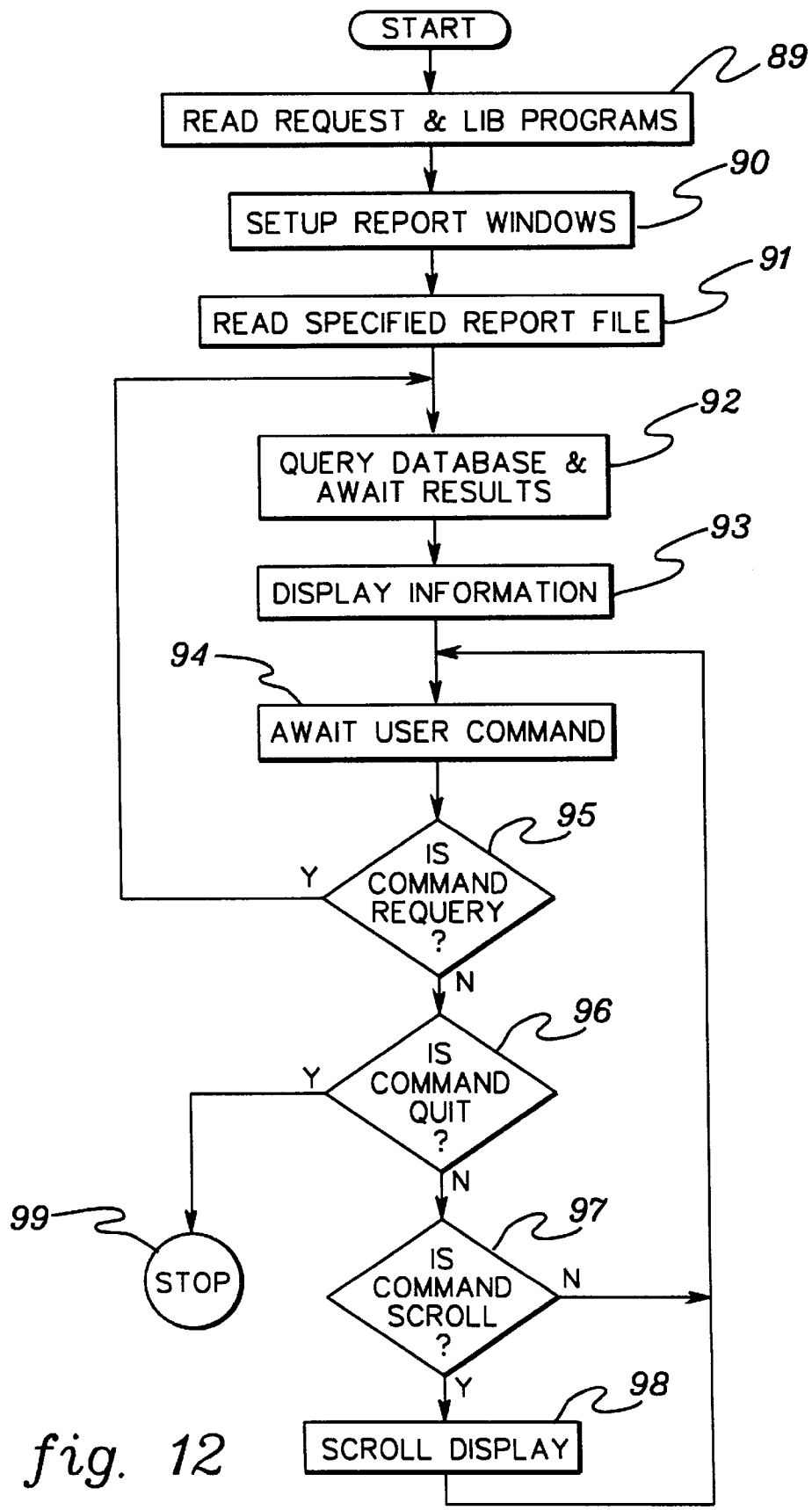
FIG. 12 illustrates one embodiment of the SYSTEMWatch AI-L report facility.

Referring to FIG. 12, the SYSTEMWatch AI-L report facility's application performs the following steps:

A. It reads the request and lib programs which are used by the SYSTEMWatch AI-L client and SYSTEMWatch AI-L console., STEP 89

B. Its sets up the window which it is running in by labeling the window's title bar accordingly, and by resizing the window if necessary, STEP 90.

C. It reads the report file to discover what types of queries messages it needs to send to the local SYSTEMWatch AI-L console. If no report file was specified in the command line to the shell script, it defaults to querying the local SYSTEMWatch AI-L console for all active alerts from all SYSTEMWatch AI-L clients, STEP 91.

D. The report facility then sends the query to the local SYSTEMWatch AI-L console and waits for the SYSTEMWatch AI-L console to send the query results back, STEP 92.

E. When the query results arrive, the SYSTEMWatch AI-L report facility displays the information in its window. If there is more information than could be displayed on the widow, SYSTEMWatch AI-L displays just the first page on the window, STEP 93.

F. The report facility then waits for a user command, STEP 94. Commands can be used to quit the report facility, to scroll forwards or backward through the window if there is more data than what could be fitted on the window, or the user can cause the report facility to requery the local console.

G. Upon receiving a user command, the report facility checks to see if the command is a requery command, INQUIRY 95. If so, jump to step D, STEP 92.

H. Report facility checks to see if the command is a quit command, INQUIRY 96. If so, the report facility quits, STEP 99.

I. The report facility checks to see if the command is a scroll command, INQUIRY 97. If so, scroll the report, STEP 98.

J. The report facility then skips to step F, STEP 94.

I claim:

1. A method for automatically managing a group of at least one managed computer comprising the steps of:

(a) executing a high-level language interpreter;

(b) expressing database operations to said high-level language interpreter; and (c) expressing expert systems rules to said high level language interpreter whereby complex decisions can be made with minimal consumption of processor and network resources at each individual managed computer without the assistance of a monitoring computer, where said at least one managed computer executes complex decisions comprising of:

gathering data;

analyzing the data to identify a specific computer condition;

constructing an alert message identifying said specific computer condition;

performing a set of validation tests on said alert message, said set of validating tests comprising:

querying for a duplicate alert message existing in a database in which previously posted alert messages are stored;

querying said database for an existing alert message associated a computer condition related to, and having a higher severity than, specific computer condition, prompting said alert message;

querying said database for an existing alert message associated with said specific computer condition which is being ignored; and querying said database for a previously cleared alert message associated with said specific computer condition within a predetermined time period;

rejecting said alert message if an existing alert was found during any one test from said set of validation tests; and displaying said alert message, when said alert message was not rejected during said validation tests, at the managed computer without inhibiting the managed computer from continuing its application processes.

2. A system of automatically managing a plurality of managed computers where a plurality of said managed computers comprise a high level language interpreter, said high level language interpreter comprises a means of expressing database operations and a means of expressing expert system rules whereby complex decisions can be made with minimal consumption of processor and network resources at each individual managed computer without the assistance of a monitoring computer, where said managed computers execute complex decisions comprising:

means for gathering data;

means for analyzing the data to identify a specific computer condition;

means for constructing an alert message identifying said specific computer condition;

means for performing a set of validation tests on said alert message, said set of validating tests comprising:

querying for a duplicate alert message existing in a database in which previously posted alert messages are stored;

querying said database for an existing alert message associated a computer condition related to, and having a higher severity than, specific computer condition, prompting said alert message;

querying said database for an existing alert message associated with said specific computer condition which is being ignored; and querying said database for a previously cleared alert message associated with said specific computer condition within a predetermined time period;

means for rejecting said alert message if an existing alert was found during any one test from said set of validation tests; and means for displaying said alert message, when said alert message was not rejected during said validation tests, at the managed computer without inhibiting the managed computer from continuing its application processes.

* * * * *